(12) United States Patent
Sosa et al.

(10) Patent No.: US 12,491,003 B2
(45) Date of Patent: Dec. 9, 2025

(54) SYSTEMS AND METHODS FOR ULTRASONIC GUIDED NEEDLE INSERTION

(71) Applicant: Kalysto Labs, LLC, San Diego, CA (US)

(72) Inventors: Fernando A. Sosa, San Diego, CA (US); Peter Liao, Santa Rosa, CA (US); Marc Bennett, Austin, TX (US); Allen Jeremias, Woodbury, NY (US); Evan Shlofmitz, Sands Point, NY (US)

(73) Assignee: Kalysto Labs, LLC, San Diego, CA (US)

( * ) Notice: Subject to any disclaimer, the term of this patent is extended or adjusted under 35 U.S.C. 154(b) by 0 days.

(21) Appl. No.: 19/184,495

(22) Filed: Apr. 21, 2025

(65) Prior Publication Data

US 2025/0325298 A1    Oct. 23, 2025

Related U.S. Application Data

(60) Provisional application No. 63/636,686, filed on Apr. 19, 2024.

(51) Int. Cl.
*A61B 17/34* (2006.01)
*A61B 8/00* (2006.01)
*A61B 8/08* (2006.01)

(52) U.S. Cl.
CPC ........ *A61B 17/3403* (2013.01); *A61B 8/0841* (2013.01); *A61B 8/461* (2013.01); *A61B 2017/3413* (2013.01)

(58) Field of Classification Search
CPC ... A61B 17/3403; A61B 8/0841; A61B 8/461; A61B 2017/3413; A61B 8/00; A61B 34/00; A61B 17/00
See application file for complete search history.

(56) References Cited

U.S. PATENT DOCUMENTS

| | | | |
|---|---|---|---|
| 4,877,033 A | * 10/1989 | Seitz, Jr. | A61B 46/17 600/101 |
| 6,361,499 B1 | * 3/2002 | Bates | A61B 17/3403 600/464 |
| 6,379,307 B1 | 4/2002 | Filly et al. | |
| 6,475,152 B1 | 11/2002 | Kelly, Jr. et al. | |
| 6,733,458 B1 | 5/2004 | Steins et al. | |
| 6,755,789 B2 | 6/2004 | Stringer et al. | |

(Continued)

FOREIGN PATENT DOCUMENTS

EP    2961255 A1    1/2016

*Primary Examiner* — Keith M Raymond
*Assistant Examiner* — Michael Yiming Fang
(74) *Attorney, Agent, or Firm* — Outlier Patent Attorneys, PLLC

(57) ABSTRACT

The device of the present invention is an ultrasound device which is used in a clinical setting to help users locate the correct position and angle for needle insertion. The device provides images of perpendicular image planes without needing to move the device thereby allowing a user to maintain a steady view of the target and surrounding anatomy in multiple image planes as the needle is advanced. The device may comprise a needle guide assembly which can adjust the needle guide angle to control needle insertion. The device may comprise a boot which provides acoustic coupling, sterility and needle guidance.

20 Claims, 19 Drawing Sheets

(56) References Cited

U.S. PATENT DOCUMENTS

| | | | |
|---|---|---|---|
| 10,485,513 B2 | 11/2019 | O'Connor et al. | |
| 10,799,212 B2 | 10/2020 | Jin et al. | |
| 2002/0133079 A1 | 9/2002 | Sandhu | |
| 2007/0276253 A1* | 11/2007 | Park | A61B 17/3403 600/461 |
| 2010/0210946 A1* | 8/2010 | Harada | A61B 8/4281 600/443 |
| 2015/0157387 A1* | 6/2015 | OuYang | A61B 1/3132 606/34 |
| 2016/0128719 A1* | 5/2016 | Cermak | A61B 17/3403 600/461 |
| 2016/0213398 A1* | 7/2016 | Liu | A61B 8/0891 |
| 2017/0000521 A1 | 1/2017 | Bizzell et al. | |
| 2020/0230391 A1* | 7/2020 | Burkholz | A61B 17/3403 |
| 2020/0253585 A1 | 8/2020 | Neben et al. | |
| 2020/0281563 A1* | 9/2020 | Muller | A61B 8/5207 |
| 2021/0196237 A1* | 7/2021 | Bellamkonda | A61B 8/463 |
| 2021/0259660 A1* | 8/2021 | Bharat | A61B 8/485 |
| 2021/0330897 A1* | 10/2021 | Burkett | A61B 5/489 |
| 2023/0000462 A1* | 1/2023 | Ta | A61B 17/3403 |
| 2023/0126296 A1 | 4/2023 | Brattain et al. | |
| 2024/0173009 A1* | 5/2024 | Adams | A61B 8/5253 |

\* cited by examiner

SYSTEMS AND METHODS FOR ULTRASONIC GUIDED NEEDLE INSERTION

CROSS-REFERENCE TO RELATED APPLICATIONS

None.

BACKGROUND

Field of Art

This invention is related to devices and methods of ultrasound imaging for needle insertion. More specifically, this invention is related to improving targeting and therefore, patient results, during needle insertions.

Background

Needle insertion procedures require accurate insertions due to the presence of anatomical structures in the body. More specifically, invasive coronary and structural procedures are inherently dangerous as they may require operating around nearby sensitive structures and puncturing of blood vessels. For example, percutaneous coronary intervention, PCI procedures are inherently dangerous since the targeted femoral artery is close to nerves and veins. PCI involves puncturing the femoral artery so that other devices, like a guidewire, may be introduced into the patient's body. The femoral artery is a high pressure blood vessel. There are anatomical landmarks that are used to guide users to the ideal puncture location. If the artery is not punctured in the correct location, undetected bleeding may occur, resulting in complications or even fatalities.

In order to properly image the blood vessel to guide to a proper puncture site, ultrasound probes are used to image the site to provide an image of the patient. Current ultrasound-guided procedures often require a clinician to manipulate a handheld ultrasound probe while simultaneously viewing a separate display screen. This separation between imaging and visualization introduces ergonomic challenges, as the user must divert attention between the probe position and the screen, making real-time adjustments more difficult. The resulting misalignment of hand-eye coordination can hinder precision, particularly in procedures that require delicate needle placement near sensitive anatomical structures. These limitations not only increase the cognitive load on the clinician but can also contribute to procedural delays and increased risk of complications.

Some existing solutions attempt to address this issue by incorporating a display directly into the ultrasound probe. While this theoretically allows users to maintain visual focus on both the insertion site and the imaging output, in practice, such integrated-display probes often prove to be bulky or unbalanced. The added display components can increase the size and weight of the probe, reducing maneuverability and making it more cumbersome to hold for extended periods. This added complexity can diminish the tactile feedback and fine control necessary for accurate navigation during needle insertion.

Additionally, various existing systems fail to provide effective or intuitive needle guidance mechanisms. In many cases, the lack of an integrated or adaptable needle guide means that clinicians must estimate the correct angle and depth manually, relying on experience and repeated trial-and-error. Even where needle guides are included, they may lack feedback systems or proper adjustability, failing to align the needle with the intended anatomical target as visualized on the ultrasound. As a result, there remains a need for improved systems that offer seamless visualization, ergonomic handling, and precise needle guidance.

Normal processes in PCI involve putting ultrasound jelly on ultrasound transducer, then putting transducer in a sterile plastic bag, then putting ultrasound jelly on outside of plastic bag or patient skin, and then taking an ultrasound measurement. The image obtained by the ultrasound device is then used to determine a proper insertion point for the procedure. The image obtained by the probe needs to be very accurate to prevent injury to the patient. Considerable effort is placed to ensure no air bubbles are in the ultrasound path as these air bubbles will corrupt the image quality.

SUMMARY

The present invention relates to an ultrasound imaging system designed to facilitate accurate and safe needle insertion during medical procedures. The system comprises a handheld ultrasound probe, a detachable sterile boot, and an integrated or attachable needle guide. The probe includes an onboard display and user controls to provide real-time imaging and feedback. The boot interfaces with the probe to maintain sterility and ensure optimal acoustic coupling with the patient. The needle guide attaches to the probe or boot assembly and assists with maintaining the correct insertion angle while providing visual confirmation of the needle path.

In one embodiment, the ultrasound probe includes a distinctive C-shaped body that improves ergonomics by allowing a clinician to simultaneously view the integrated display and manipulate the control interface while maintaining contact with the patient. This design facilitates better hand positioning, reduces wrist strain, and allows for more intuitive interaction with imaging controls during delicate procedures, thereby increasing user comfort and precision.

The sterile boot is configured to provide a consistent and controlled gel standoff between the ultrasound transducer and the patient's skin, improving image quality by eliminating air gaps and ensuring proper acoustic coupling. The boot also includes a sheath that fully encloses the handheld probe, maintaining sterility throughout the procedure without impeding access to the display or user interface. The design allows for quick installation and disposal between uses.

The needle guide includes features that confirm proper attachment to the probe, such as magnetic sensors or locking interfaces, and integrates with the software to determine and display the projected trajectory of the needle on the ultrasound screen. By visualizing the expected needle path in real-time, the system enables clinicians to make precise adjustments prior to puncture, enhancing safety and confidence during insertion.

The transducer array within the probe features an F-shaped configuration, comprising a linear longitudinal array and a series of transverse phased arrays spaced along its length. This arrangement allows for simultaneous or rapidly switchable imaging in two orthogonal planes-longitudinal and transverse-without requiring rotation or repositioning of the probe. Such dual-axis imaging enhances spatial awareness and anatomical localization, particularly when guiding a needle toward a target structure.

The device of the present invention is an ultrasound device which is used in a clinical setting to help users locate the correct position and angle for needle insertion. The device also measures blood flow in the region of the needle insertion, to determine post operatively, if the bleeding is still occurring. This prevents undetected bleeding.

The present invention maximizes the image quality obtained by addressing common issues associated with ultrasonic coupling mediums such as ultrasound gel. The device incorporates a boot and a set of rails to orient the ultrasound device against the boot, eliminating the presence of air bubbles.

The present invention incorporates artificial intelligence, AI, features that label anatomical structures accurately. In addition, the AI will make recommendations for a user for a proper setting for the needle guide and location for a safe insertion site.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

FIG. 1l illustrates an exemplary ultrasound unit according to an embodiment of the invention.

DETAILED DESCRIPTION OF EMBODIMENTS

Figure 1A:
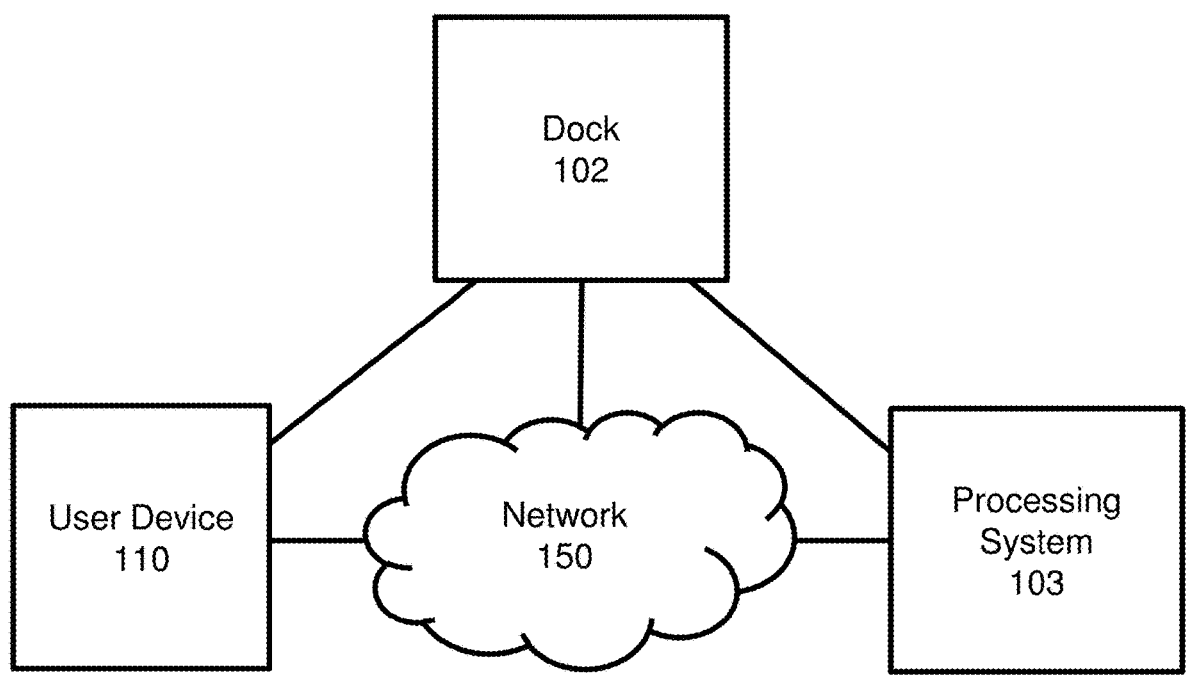
FIG. 1a illustrates an exemplary embodiment of an ultrasound imaging and needle guiding system.

The device of the present invention is an ultrasound device which is used in a clinical setting to help users locate the correct position and angle for needle insertion. The device also measures blood flow in the region of the needle insertion, to determine post operatively, if the bleeding is still occurring. This prevents undetected bleeding.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

FIG. 1a illustrates an exemplary embodiment of a system for ultrasound guided needle insertion according to one embodiment. The system includes a user device 110, dock 102, processing system 103, and a network 150 over which the various systems communicate and interact. The various components described herein are exemplary and for illustration purposes only and any combination or subcombination of the various components may be used as would be apparent to one of ordinary skill in the art. The system may be reorganized or consolidated, as understood by a person of ordinary skill in the art, to perform the same tasks on one or more other servers or computing devices without departing from the scope of the invention.

User device 110 may comprise an ultrasound device (e.g. ultrasonic needle guidance system 1500, handheld ultrasound unit 1000, etc.). The ultrasound device may comprise an ultrasound probe. The ultrasound device may be a handheld device for acquiring images of a patient and/or providing feedback to a user. The user device 110 may comprise a boot operable to engage with ultrasound probe. The boot may provide ultrasonic coupling between the probe and the patient. The boot may comprise a needle guide. The needle guide may comprise an adjustment mechanism allowing adjustment of the angle of the needle guide. The user device 110 is generally operable to obtain images of patient anatomy, process the images and/or transmit the images to an external component for processing, and display feedback to the user. The feedback may comprise at least one of images of the anatomy, a recommended needle guide angle, and information indicating to the user where to move or position the user device during a procedure. Additional details of the user device 110 are provided below in association with FIGS. 1b-1m.

User device(s) 110 include, generally, a computer or computing device including functionality for communicating (e.g., remotely) over a network 150. Data may be collected from user devices 110, and data requests may be initiated from each user device 110. User device(s) 110 may be a server, a desktop computer, a laptop computer, personal digital assistant (PDA), an in- or out-of-car navigation system, a smart phone or other cellular or mobile phone, or mobile gaming device, among other suitable computing devices. User devices 110 may execute one or more applications, such as a web browser (e.g., Microsoft Windows Internet Explorer, Mozilla Firefox, Apple Safari, Google Chrome, and Opera, etc.), or a dedicated application to submit user data, or to make prediction queries over a network 150.

In particular embodiments, each user device 110 may be an electronic device including hardware, software, or embedded logic components or a combination of two or more such components and capable of carrying out the appropriate functions implemented or supported by the user device 110. For example and without limitation, a user device 110 may be a desktop computer system, a notebook computer system, a netbook computer system, a handheld electronic device, or a mobile telephone. The present disclosure contemplates any user device 110. A user device 110 may enable a network user at the user device 110 to access network 150. A user device 110 may enable its user to communicate with other users at other user devices 110.

A user device 110 may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user device 110 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 110 one or more Hyper Text Markup Language (HTML) files responsive to the HTTP request. The user device 110 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 110 may also include an application that is loaded onto the user device 110. The application obtains data from the network 150 and displays it to the user within the application interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client/user devices or other devices in response to HTTP or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. Other databases and systems may be added or subtracted, as would be readily understood by a person of ordinary skill in the art, without departing from the scope of the invention.

Dock 102 is operable to interface with user device 110 and provide a data communication interface and/or a power supply interface. Dock 102 may transmit data between the user device 110 and processing system 103 via direct communication and/or via network 150. In one aspect, dock 102 may comprise processing hardware and/or software suitable for processing obtained images without the need for communication with a separate processing system 103. For example, the dock may be operable to execute the processing operations of the processing system as described below.

Processing system 103 is operable to process obtained images and determine feedback to be provided to a user via user device 110. Although depicted as a separate component in FIG. 1a, processing system 103 may be incorporated into dock 102 as discussed above and/or incorporated into user device 110 (e.g. as software module 1002 as depicted in FIG. 1l). Processing system 103 may analyze obtained images using artificial intelligence (AI) and/or machine learning (ML) in order to identify anatomy and/or determine at least one of a target puncture site of a blood vessel and a target needle guide angle.

Figure 1B:
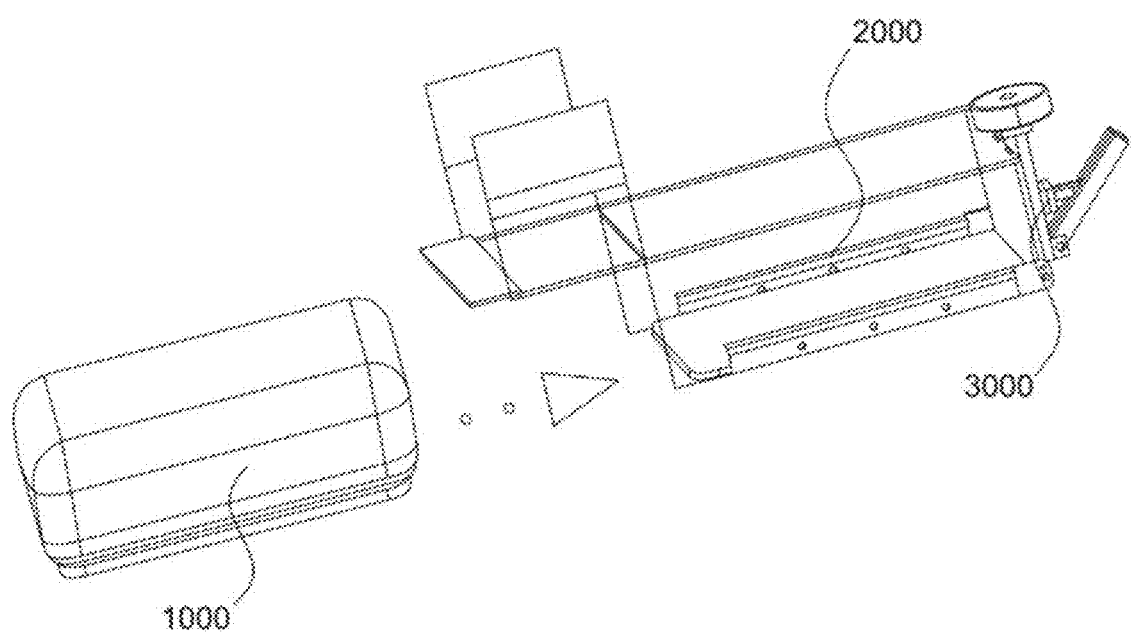
FIG. 1b illustrates an ultrasound device and holder of an embodiment of an ultrasound imaging and needle guiding device.

FIG. 1b illustrates an example device capable of executing the software described in the invention. The device may comprise a handheld ultrasound unit 1000, a boot 2000, and a needle guide 3000.

The handheld ultrasound unit 1000 may be used to gather images and make recommendations related to needle insertion for a medical procedure. In an embodiment of the invention, the medical procedure is PCI, however the device may be used with other medical procedures known in the art that require proper needle insertion. Alternatively, the handheld ultrasound unit 1000 may be used to provide imaging identification of anatomical structures without the inclusion of a needle guide. The handheld ultrasound unit 1000 may connect to a docking station through either wireless or usb connections for the purpose of exchanging of patient ultrasound imagery and AI data, for battery recharge, downloading of data, and Firmware updates.

The boot 2000 may be used to surround the ultrasound unit for use in a sterile environment. The boot 2000 may be made of plastics (e.g. clear plastics) and be disposable. The boot 2000 may comprise a waterproof, disposable sterile covering that completely encloses handheld ultrasound unit 1000 during a Percutaneous Cardiac Intervention (PCI) procedure or other related medical procedures. A user may apply jelly to the outside of the boot 2000 to improve image quality. The boot 2000 may be collapsed where the needle guide 3000 is folded down, for more compact storage and when in use, the needle guide 3000 may be upright and perpendicular to the boot.

The needle guide 3000 may provide the proper angle for needle insertion for a user. The needle guide may be adjustable and removable from the holder if the user prefers manual needle insertion. The needle guide 3000 may comprise plastics appropriate for a sterile location and be disposable after use.

Figure 1C:
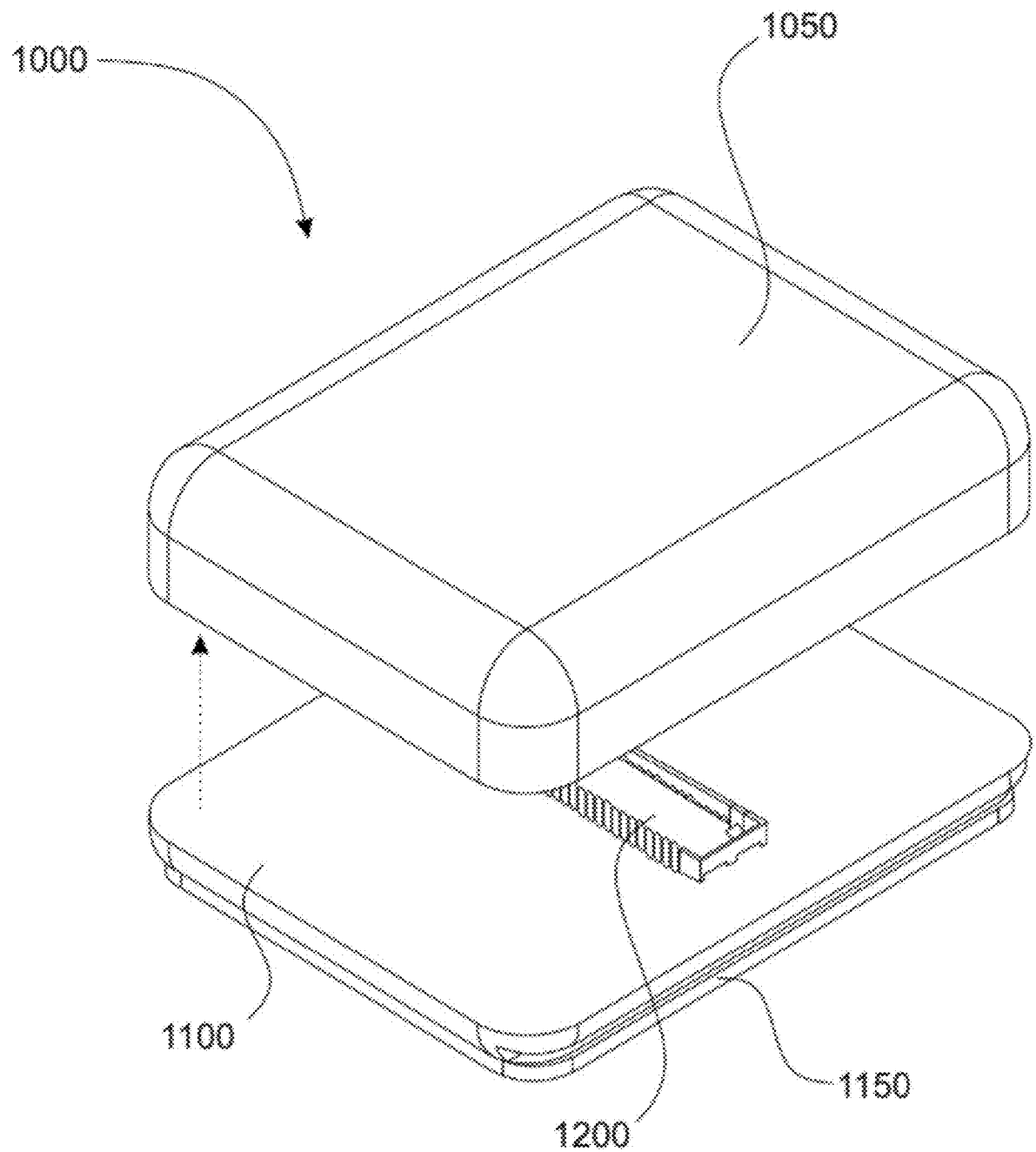
FIG. 1c illustrates an ultrasound imaging device of an embodiment of an ultrasound imaging and needle guiding device.

FIG. 1c illustrates an embodiment of the handheld ultrasound unit 1000. The handheld ultrasound unit 1000 may comprise a display unit 1050, an ultrasound base unit 1100, a slot 1150, and a data connection 1200.

The display unit 1050 may be used to project an image gathered by the ultrasound base unit 1100. The display unit 1050 may comprise a housing, a liquid crystal display, LCD, screen and user interface components 1300. The display unit 1050 allows the user to maintain a continuous line of sight between the imaging output and the insertion site, improving hand-eye coordination and procedural accuracy. The display 1050 may receive processed image data from an onboard or external computing module and may present anatomical structures, needle guidance overlays, and system feedback through a high-resolution interface. In one embodiment, the display 1050 is fixed in position relative to the probe; however, alternative configurations may include a telescoping display 1050 that can be extended or retracted to improve visibility, or a hinged display 1050 that allows angular adjustment to reduce glare or accommodate different viewing angles. The display unit 1050 may comprise a data exchange interface comprising at least one of a physical connection and wireless connection.

The ultrasound base unit 1100 may be used to gather ultrasound data to be communicated to the display unit 1050. The ultrasound base unit 1100 may comprise a housing and an ultrasound transducer array. In an embodiment of the invention the ultrasound array may be "T" or "F" shaped, but various array shapes may be used based on the image type needed for the medical procedure. As imaging needs change, different modules may be plugged in for best ultrasound images.

The slot 1150 may be used to attach the ultrasound unit 1000 to the boot 2000. The set of slots 1150 or channels configured to engage with corresponding rails or projections on the sterile boot 2000, thereby securing the probe 1000 in a fixed and repeatable orientation relative to the boot 2000 during use. These slots 1150 may guide the insertion of the probe 1000 into the boot 2000 and ensure proper alignment of the transducer with the acoustic window, minimizing the risk of air gaps and misalignment that could degrade image quality. The mechanical interface between the slots and rails also facilitates rapid attachment and detachment, allowing for efficient setup and disposal in sterile environments. Other joining mechanisms known in the art may be used in place of the rails, such as locking fasteners.

An optional data connection 1200 may be used to communicate between the display unit 1050 and ultrasound base unit 1100. Additionally the data connection may provide a locking fit between the display unit 1050 and ultrasound base unit 1100. to the bottom of the main handheld unit to transmit ultrasound data and control the elements of the ultrasound array. The data connection 1200 may comprise a multi pin connector interface or other known connections in the art. Alternatively, wireless communication interfaces may be used.

Figure 1D:
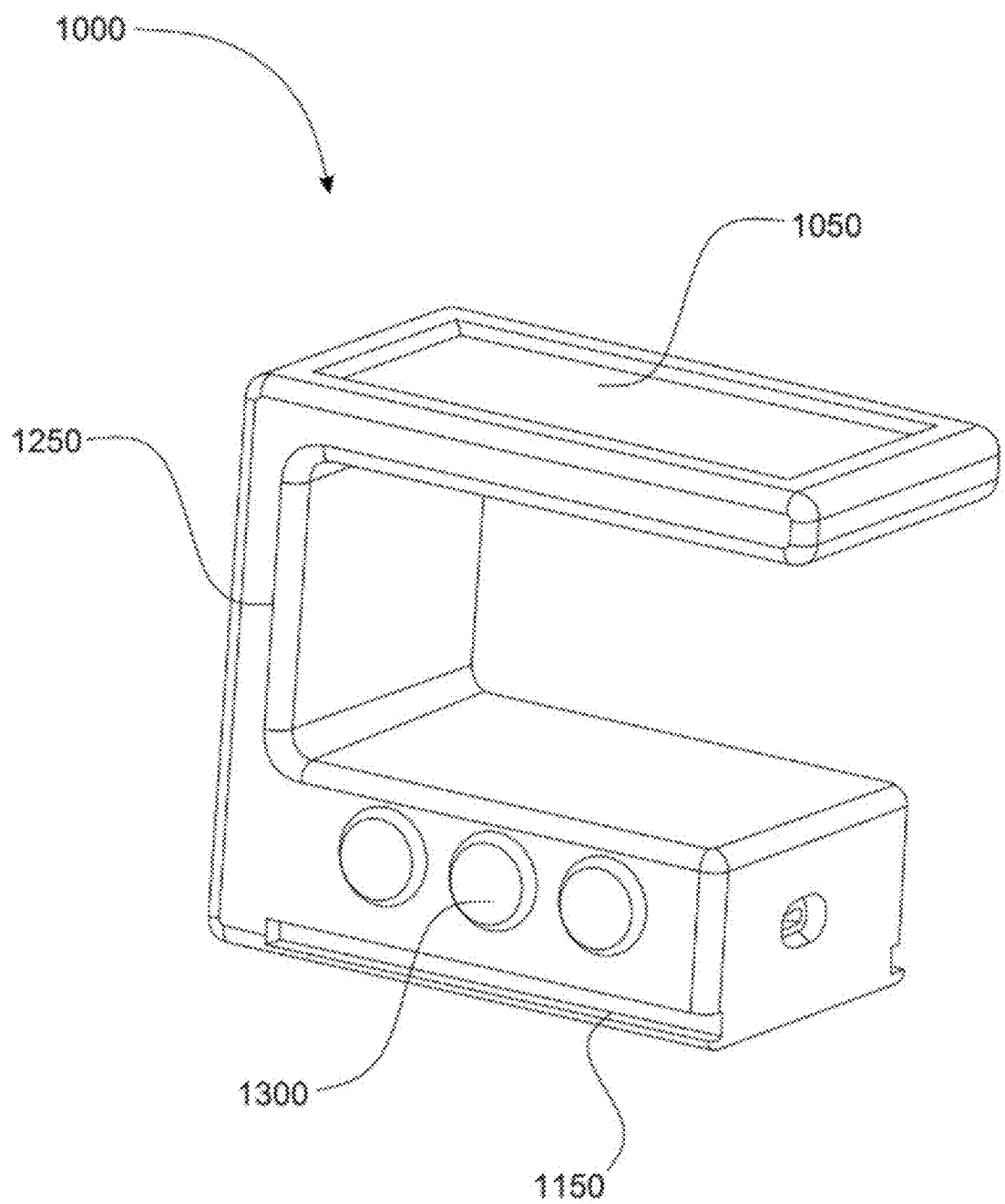
FIG. 1d illustrates an exemplary ultrasound imaging and needle guiding device according to an embodiment of the invention.

FIG. 1d illustrates an example of the handheld ultrasound unit 1000. The handheld ultrasound unit 1000 may comprise the same components found in FIG. 1c, and additionally a rigid arm 1250 and a set of user controls 1300. The ultrasound unit 1000 may be arranged in a C shape to allow for a user to place their hand underneath the display 1050 to enable a user to manipulate the controls while still being able to view the display.

The rigid arm 1250 may comprise an integrated section of the ultrasound unit 1000 housing. The rigid arm 1250 maintains a fixed spatial relationship between the imaging plane and controls 1300 and the display 1050, enabling a user to intuitively interpret image data while manipulating the probe. By positioning the display 1050 directly in the user's line of sight and ensuring alignment with the transducer orientation, the rigid arm 1250 enhances ergonomics and visual continuity during procedures. In alternative embodiments, the rigid arm 1250 may be replaced or supplemented by a telescoping section, allowing vertical adjustment of the display height to accommodate different user preferences or clinical environments. Similarly, a hinged or pivoting section may be incorporated to allow angular adjustment or folding of the display for improved portability or storage.

User controls 1300 may comprise a user interface for allowing the user to provide input related to control of the system. User controls 1300 may comprise one or more physical controls including, but not limited to, button, knob, toggle, dial, switch, slider, and/or touch sensor. In one aspect, user controls may be embodied in display 1050 (e.g. via touchscreen controls displayed on display 1050). User controls 1300 may serve to provide various functions such as, but not limited to, switching between displayed views (e.g. between longitudinal and transverse), receiving input from a user indicating a target to be reached with a needle, storing/saving images, and the like.

Figure 1E:
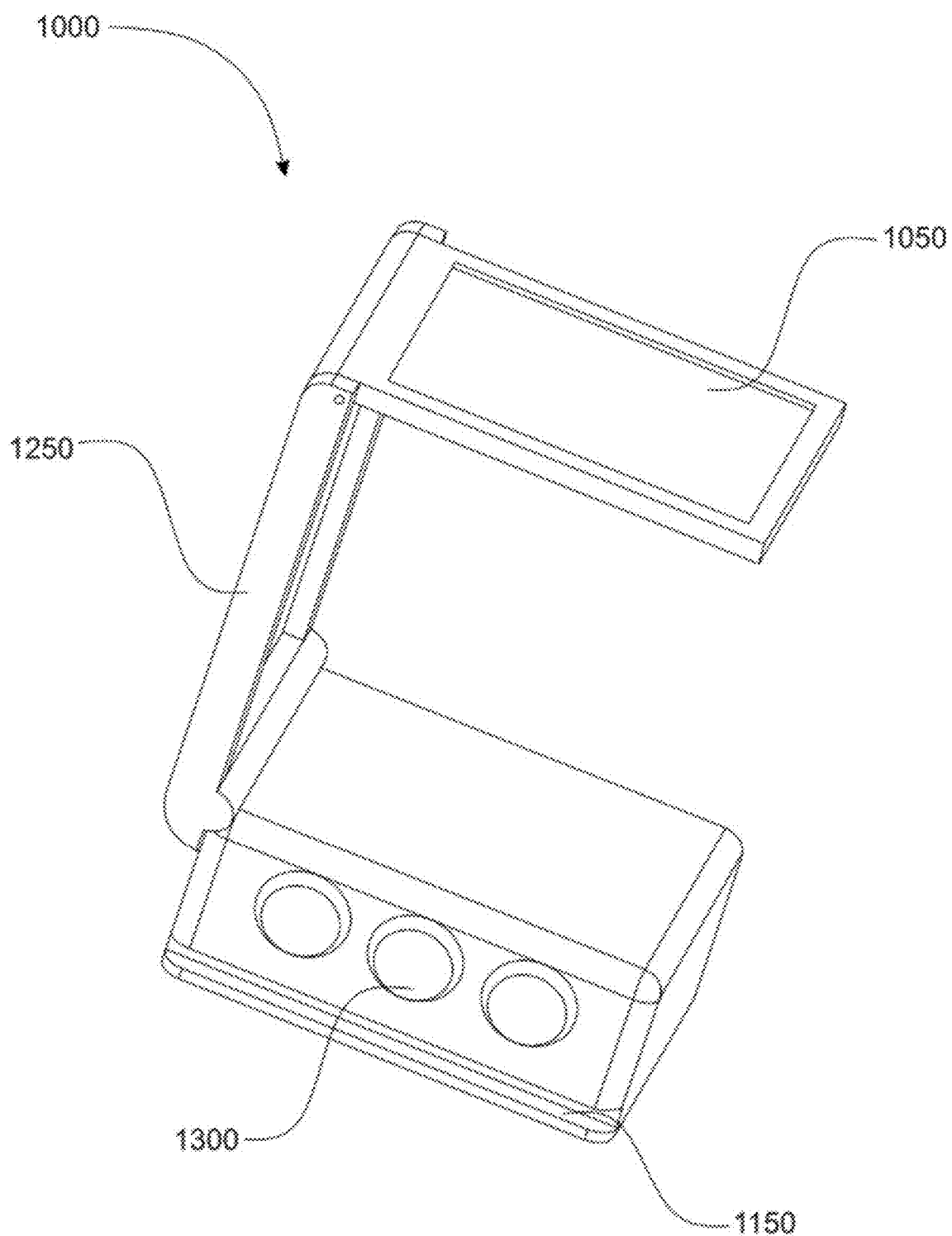
FIG. 1e illustrates an exemplary ultrasound imaging and needle guiding device of an embodiment of an ultrasound imaging and needle guiding device.

FIG. 1e illustrates an example of the handheld ultrasound unit 1000. The handheld ultrasound unit 1000 may incorporate the previously described components, but arranged with a hinged display 1050 and rigid arm 1250.

Figure 1F:
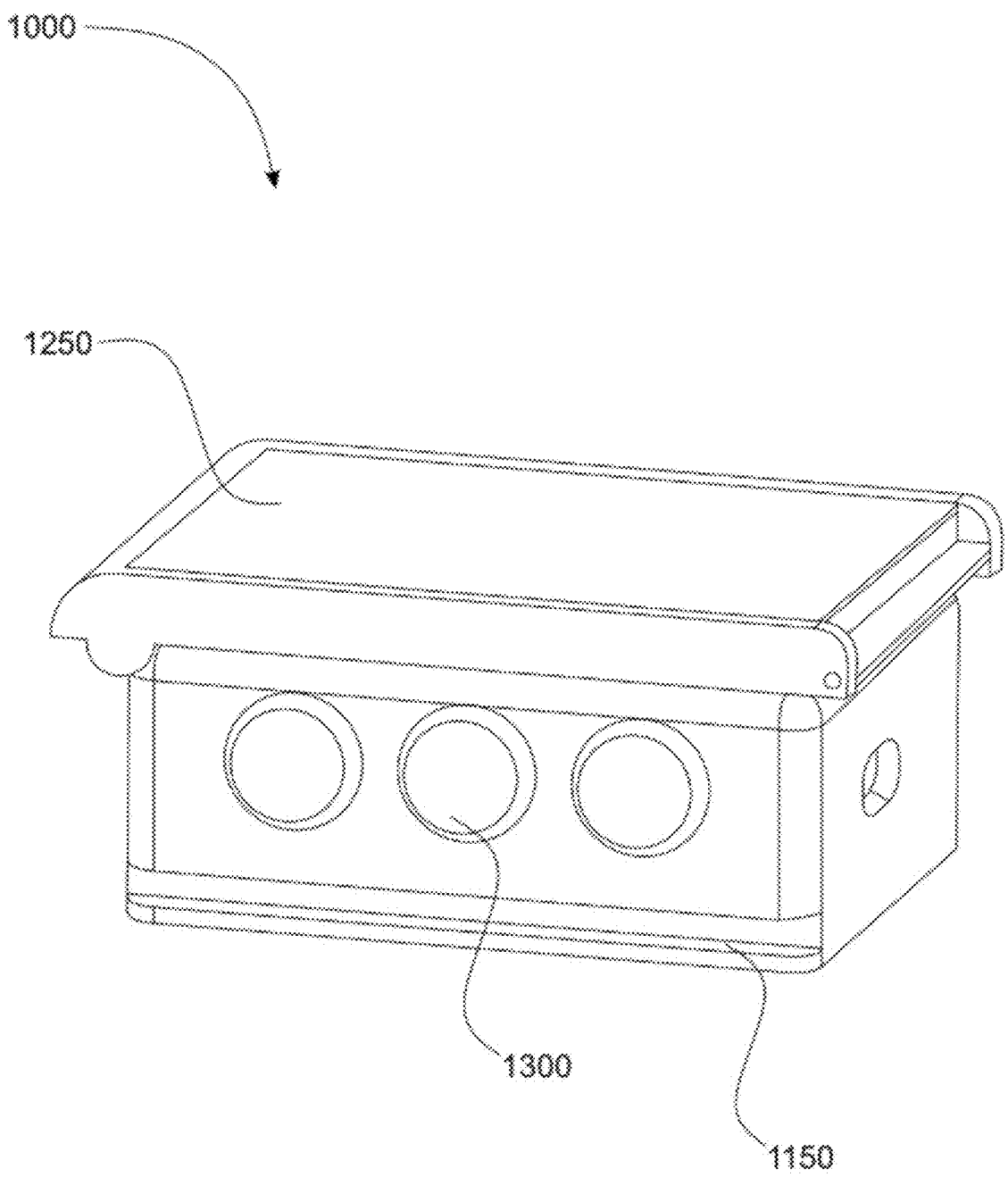
FIG. 1f illustrates an exemplary ultrasound imaging and needle guiding device of an embodiment of an ultrasound imaging and needle guiding device.

FIG. 1f illustrates an example of the handheld ultrasound unit 1000. The handheld ultrasound unit 1000 is pictured in the folded up form of FIG. 1e. The display 1050 is contained within the rigid arm 1250 and protected for ease of transportation.

Figure 1G:
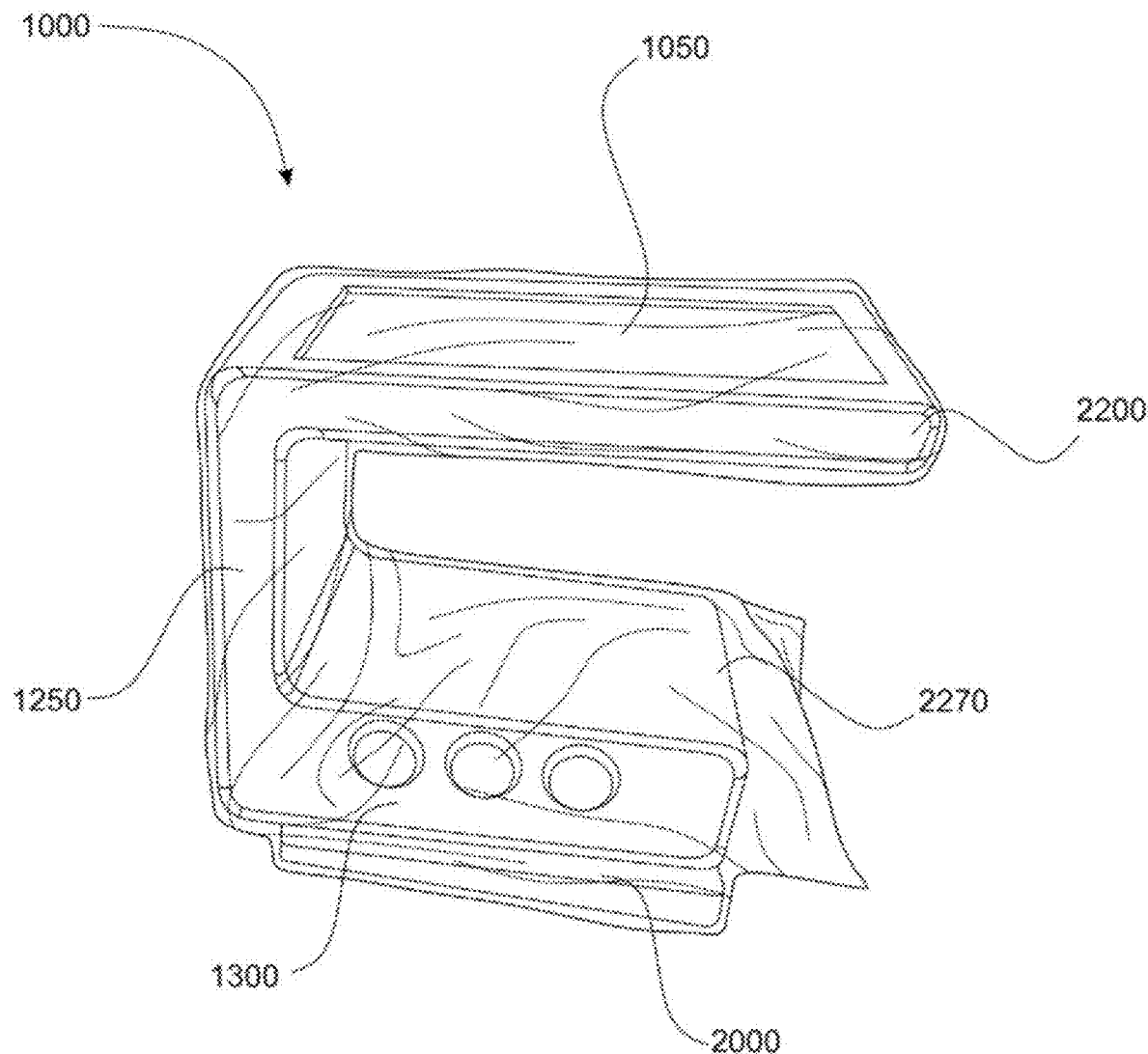
FIG. 1g illustrates an exemplary ultrasound imaging and needle guiding device according to an embodiment of the invention.

FIG. 1g illustrates an example of the handheld ultrasound unit 1000 and boot 2000. The handheld ultrasound unit 1000 may comprise the C shaped embodiment found in FIG. 1d or 1e. The boot 2000 is attached to the base of the ultrasound unit 1000 by sliding the slot 1150 and the lip 2300 together to maintain the proper spacing of the boot 2000 and probe 1000. The sheath 2200 attached to the boot, may encompass the ultrasound unit 1000 to maintain a sterile barrier between the unit 1000 and patient.

Figure 1H:
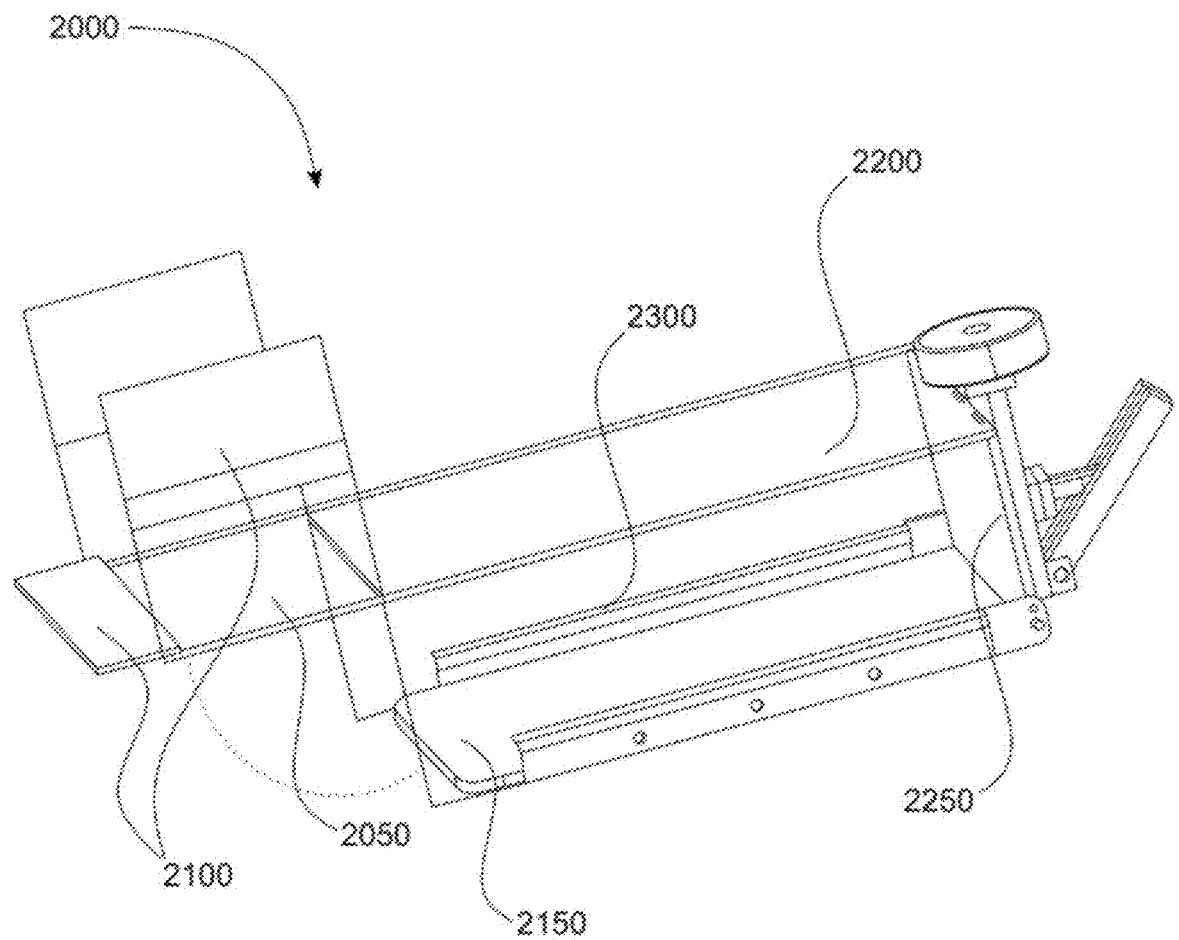
FIG. 1h illustrates an exemplary ultrasound imaging system according to an embodiment of the invention.

FIG. 1h illustrates an example of the boot 2000. The boot 2000 may comprise a lid 2050, a set of flaps 2100, a boot base 2150, a sheath 2200, a guide panel 2250, and a lip 2300.

The lid 2050 may be used to enclose the ultrasound unit 1000. The lid 2050 may comprise a foldable member attached to the sheath 2200. When open, the lid 2050 does not obstruct the opening of the sheath 2200 and when closed the lid may fully enclose and retain the ultrasound device 1000. The lid may also comprise protrusions that help hold the ultrasound device 1000 into a proper position. The lid may also comprise a portion of the sheath 2200 folded over itself.

The set of flaps 2100 may be used to attach the lid 2050 to the sheath 2200. The set of flaps 2100 may comprise at least one adhesive strips, interlocking tabs, or hook-and-loop fasteners that releasably join the flaps 2100 together and/or to the sheath body 2200, ensuring a tight and stable enclosure around the device.

The boot base 2150 may be used to provide an interface between the ultrasound unit 1000 and a patient. The boot base 2150 may comprise a gel pad or unitary piece. The boot base 2150 may comprise a material which has the same acoustic impedance as ultrasound gel which may comprise an ultrasound transparent material. The boot base 2150 may further comprise a hole for a circular hemispherical "nub" on the side of the guide panel 2250 to lock the guide panel 2250 at 90 degrees.

The sheath 2200 may be used to hold the ultrasound device 1000 in a sterile environment while still allowing for viewing of the display and interfacing with a user. The sheath 2200 may comprise a transparent plastic covering that allows users to clearly view LCD displays on ultrasound device 1000. The back of the sheath 2200 may have a waterproof seal which is closed after the handheld device has been seated in the bag. The sheath may be semi-rigid or malleable.

The guide panel 2250 may be used to provide a backstop for the ultrasound device 100 when fully inserted in the boot 2000. The guide panel 2250 may comprise rigid plastic that may be transparent or opaque. The guide panel 2250 may further comprise a holder for attachment of a removable and adjustable needle guide. Alternatively, the guide panel 2250 may be integrated into the boot 2000 and boot base 2150 as a single component.

The lip 2300 may be positioned at the interface where the ultrasound probe 1000 is inserted into the boot 2000, serving to align and stabilize the probe 1000 during engagement. This lip 2300 may comprise raised ridges or integrated guide rails that mate with corresponding slots on the probe, ensuring precise positioning of the transducer array relative to the acoustic window of the boot. By constraining the orientation and depth of insertion, the lip helps eliminate variability in placement, reduces the potential for air gaps in the imaging path, and ensures consistent acoustic coupling between the probe and patient. In some embodiments, the lip 2300 may include a tactile or audible feedback mechanism, such as a detent or snap fit, to confirm proper seating of the boot 2000.

Figure 1I:
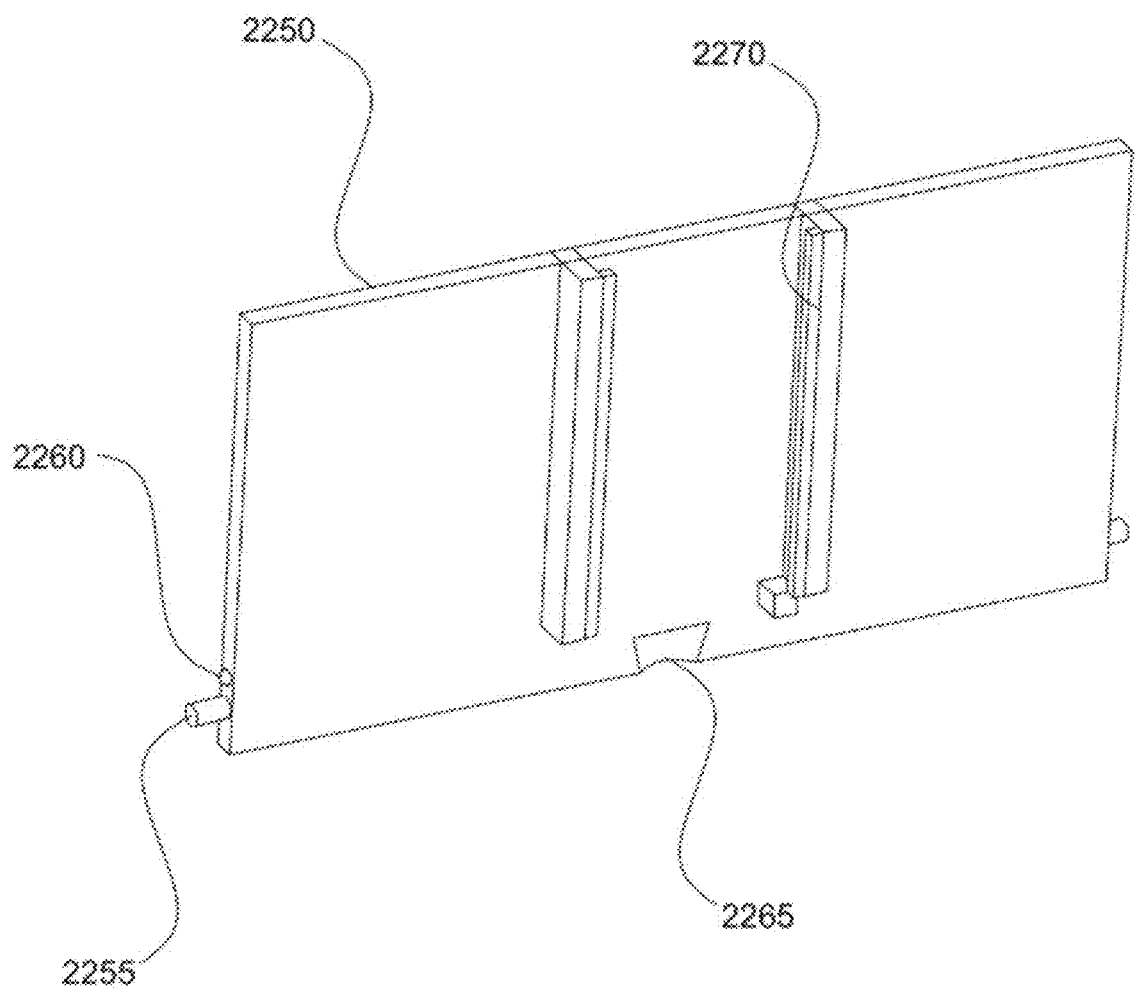
FIG. 1i illustrates an exemplary guide panel according to an embodiment of the invention.

FIG. 1i illustrates an example of the guide panel 2250. The guide panel 2250 may comprise a peg 2255, a locking nub 2260, a notch 2265, and a needle guide interface 2270.

The peg 2255 may be used to provide a folding mechanism for the boot 2000 and guide panel 2250 interface. The peg 2255 may comprise a circular protrusion. The peg 2255 may allow the guide panel 2250 to rotate freely inside the ultrasound boot. Hinges or other locking and rotation members known in the art may be used in alternative to the peg 2255.

The locking nub 2260 may be used to provide a locking mechanism to orient the guide panel 2250 in an ideal orientation. The locking nub 2260 may comprise a hemispherical protrusion on both sides of the guide panel 2250 allowing it to lock in place at 90 degrees on the ultrasound boot 2000. Other locking mechanisms known in the art may be used as an alternative to the locking nub 2260.

The notch 2265 may be used to provide easy access for needle insertion without the use of the guide 3000. The notch 2265 may comprise a rounded groove to assist a user in positioning the needle. The notch The notch 2265 may be eliminated in other embodiments of the invention.

The needle guide interface 2270 may be used to releasably hold the needle guide 3000. The needle guide interface 2270 may comprise a set of protrusions located on either the guide panel of the boot or the base of the needle guide, configured to mate with corresponding recesses or rails on the needle guide 3000. These protrusions function as a mechanical interlock, securely joining the needle guide 3000 to the boot 2000 in a fixed and repeatable orientation. This stable connection ensures that the needle guide remains properly aligned with the imaging plane of the ultrasound transducer, enabling accurate needle trajectory visualization and guidance. The protrusions may include features such as detents, clips, or keyed geometries to prevent misalignment or unintended detachment during use. In alternative embodiments, the interface may incorporate flexible snap-fit elements.

Figure 1J:
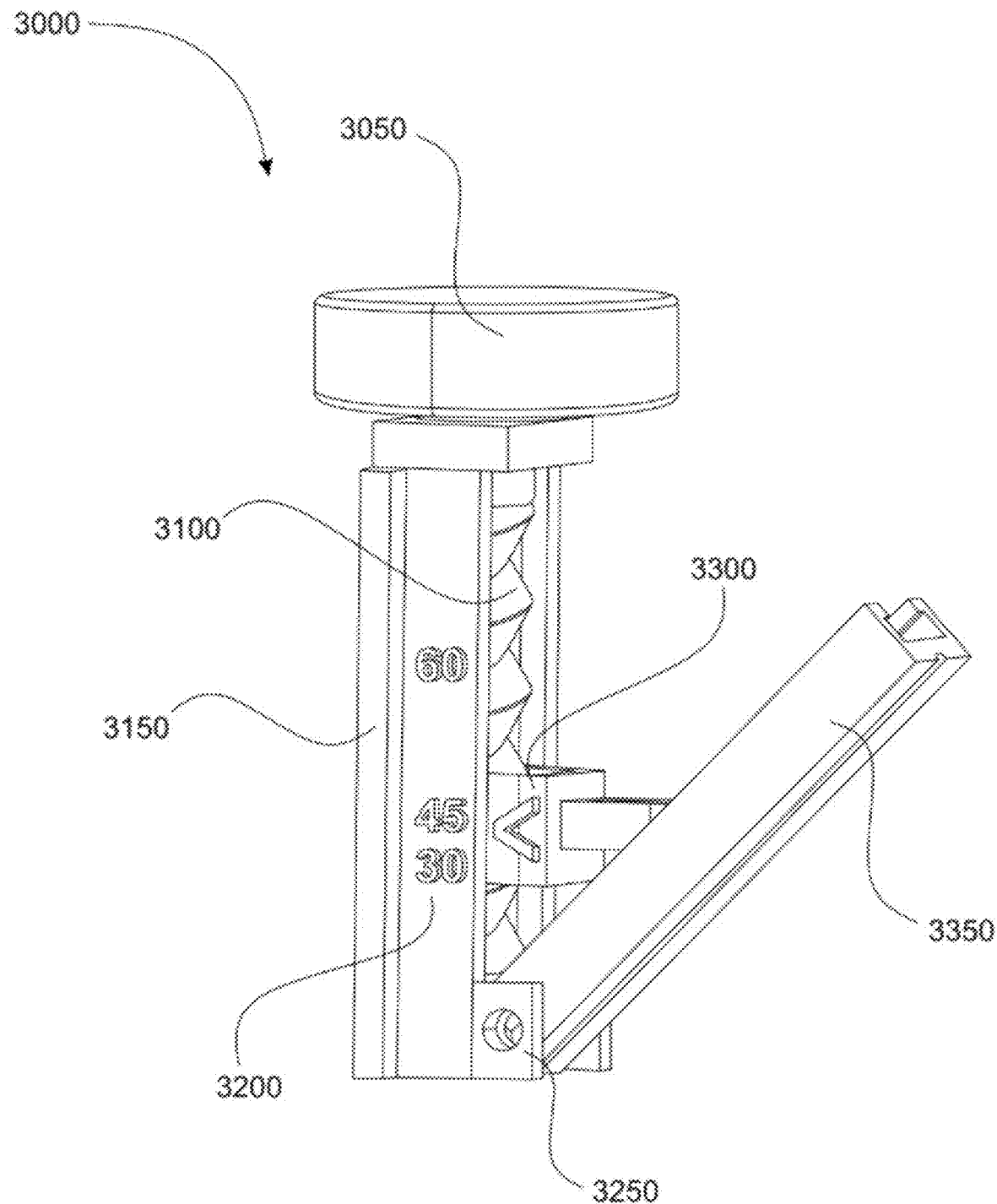
FIG. 1j illustrates an exemplary needle guide device according to an embodiment of the invention.

FIG. 1j illustrates an example of the needle guide 3000. The needle guide 3000 may comprise a handle 3050, a screw 3100, a boot connector 3150, an index 3200, a hinge 3250, a screw nut 3300 and an inclined guide 3350.

The handle 3050 may be used to adjust the needle entry angle. The handle 3050 may comprise a knob or other appropriate user interface known in the art. In an embodiment of the invention, twisting the handle 3050 results in rotation of the screw 3100 which moves the screw nut 3300 vertically on the screw 3100. The rotation and movement of the screw nut produces a different angle of needle insertion. Alternatively, the knob may be a fully motorized knob or a hybrid of manual and motorized interfaces. The handle may be able to communicate with the ultrasound probe 1000 in order to receive commands on how to adjust the handle 3050 or inclined guide 3350.

The screw 3100 may be used to carry the screw nut movably within the needle guide 3000. The screw 3100 may comprise a screw with a large pitch so few turns are required to go through the entire needle angle range. Alternatively, the screw may have a smaller pitch to allow for finer adjustment. The screw 3100 may comprise a size to fit within the needle guide housing and allowing full range of movement without allowing the screw 3100 to leave the housing. In an embodiment of the invention, the range may comprise angles between 30 and 60 degrees. The screw 3100 may have a hole just beneath the top plate below where the handle rests. A pin is may be inserted into this hole, so that the screw 3100 does not unscrew itself from the needle guide assembly through normal operation.

The boot connector 3150 may be designed to mechanically and electronically interface with the boot 2000 and ultrasound probe 1000, ensuring proper attachment and enabling system feedback regarding guide placement. This boot connector 3150 may comprise a set of structural features, such as rails, clips, or protrusions, that mate with corresponding elements on the boot 2000 to secure the guide in a fixed orientation relative to the imaging plane. An embodiment of the boot connector may comprise a magnet configured to interact with a sensor array located within the ultrasound probe 1000. When the connector is fully engaged, the sensor array detects the presence and position of the magnet, confirming proper seating of the needle guide and enabling the system to activate needle path prediction features or display alignment overlays on the user interface. In alternative embodiments, the boot connector 3150 may include other connecting mechanisms that include, but are not limited to, screw fasteners.

The index 3200 may be used to indicate angle between the inclined guide 3350 and horizontal. The index 3200 may comprise a set of numbers printed or raised on the needle guide housing, easily viewable by a user. The index may also be displayed by electronic or other known means. Alternatively, the index 3200 may be omitted and the ultrasound device 1000 may display the known angle on the display 1050.

The hinge 3250 may be used to provide a joint between the needle guide 3000 and the inclined guide 3350. The hinge may comprise a rotational joint, and additionally, the hinge 3250 may comprise a magnet or other transmitter inside it that can transmit distance to the ultrasound unit 1000. In an embodiment of the invention two magnets are present on the needle guide 3000. In one instance, the magnet can be placed behind the hinge 3250. Alternatively, it can be placed near the top surface of the needle guide, just below the handle 3050. This magnet is present to allow the handheld device to determine that the needle guide has been inserted fully. Another magnet may be attached to the screw nut 3300, and moves up and down as the needle angle is varied. By knowing the distance between the two magnets, the angle of the inclined guide can be known by the ultrasound unit 1000. This allows for the ultrasound unit to provide detailed instructions and predict the path of the needle before it is inserted into the patient.

The screw nut 3300 may be used to move along the screw 3100 to adjust the angle of the inclined guide 3350. The screw nut 3300 may comprise a guide arrow to provide indication of the angle of the inclined guide 3350 when used with the index 3200. The screw nut may also comprise a magnet or other transmitter inside it that can transmit distance to the ultrasound unit 1000. By knowing the distance between the hinge 3250 and the screw nut 3300, the angle of the inclined guide can be known by the ultrasound unit 1000. The screw nut may comprise a rod that fits within a channel on the inclined guide 3350. This allows for the ultrasound unit to provide detailed instructions and predict the path of the needle before it is inserted into the patient.

The inclined guide 3350 may be used to provide a way for the user to rest a needle for insertion against the inclined guide 3350 and know what angle the needle is being inserted at. The inclined guide 3350 may comprise a channel to allow for the free movement of the rod from the screw nut 3300. The inclined guide 3350 may comprise a groove on one side that can accommodate a needle. The groove may allow for a needle to be placed along the guide and ensure the angle of the inclined guide 3350 and the needle are identical. The inclined guide 3350 may be formed of plastic or other surgically appropriate materials known in the art.

Figure 1K:
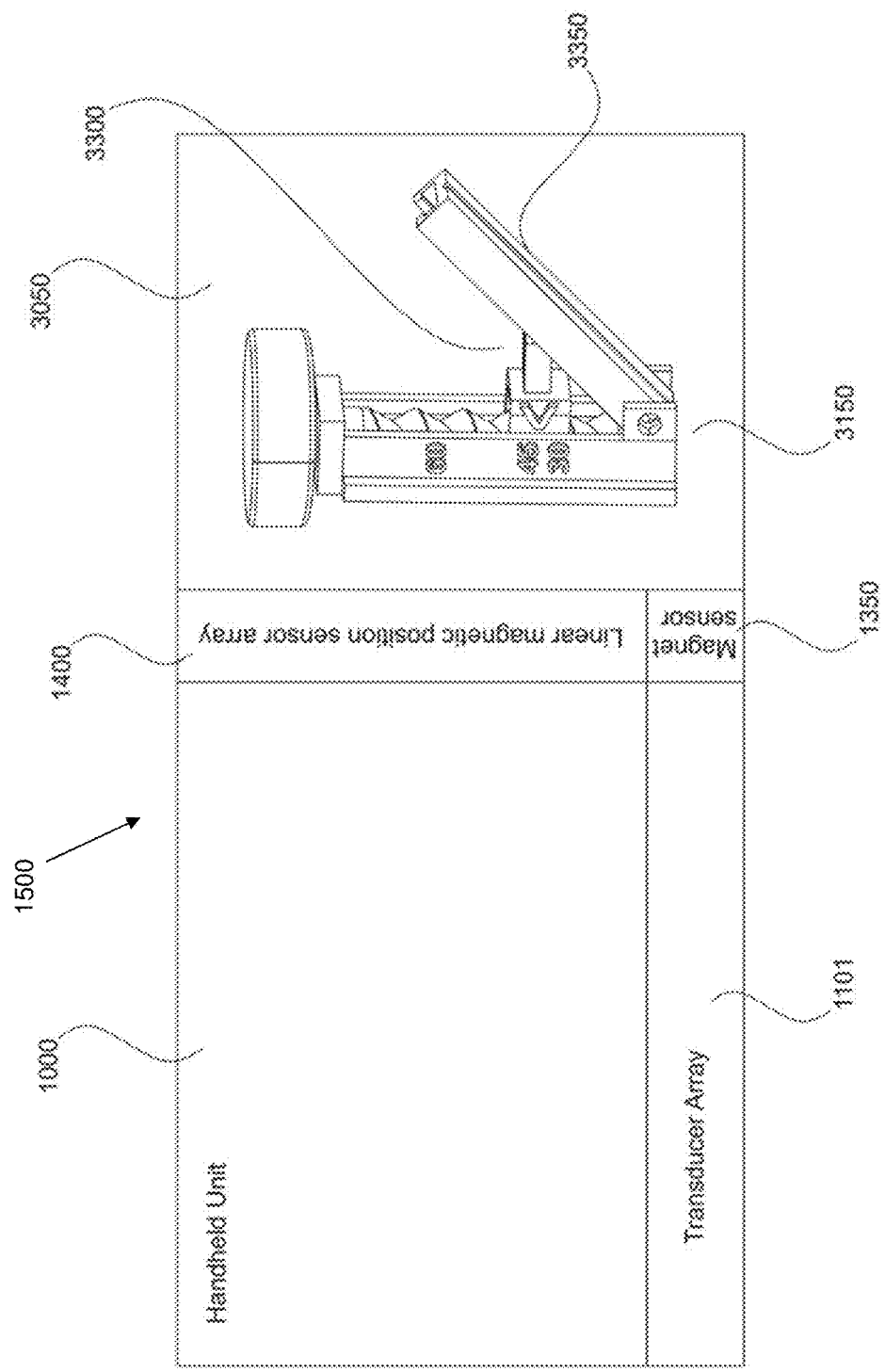
FIG. 1k illustrates an exemplary system for ultrasonic needle guidance according to an embodiment of the invention.
Figure 1I:
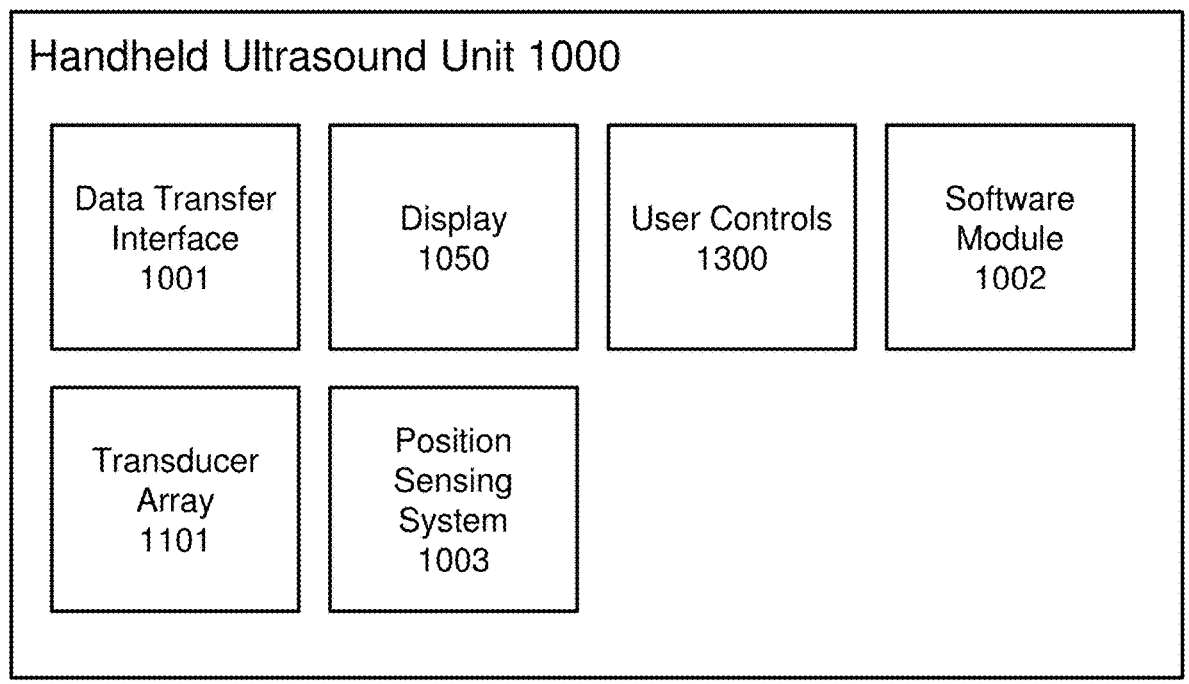

FIG. 1k illustrates an exemplary system 1500 for ultrasonic needle guidance according to an embodiment of the invention. The system comprises a handheld unit 1000, an ultrasound transducer array 1101, a magnet sensor 1350, a magnetic position sensor array 1400 and a needle guide assembly 3000 (comprising needle guide rail 3350, needle guide angle adjustment mechanism 3050, magnet 3150, and wedge piece 3300 comprising a magnet (as described above). As a magnet in the wedge piece 3300 (see A) moves up and down along the needle guide, its magnetic field can be detected by a linear array of magnetic field sensors placed inside the handheld ultrasound unit, in proximity to the needle guide. Changes in the magnetic field strength as measured by the magnet position sensing array can be used to determine whether magnet A is moving closer to or further away from the base of the unit (at magnet sensor/location B). Given known geometry of the needle guide components, measurements by the magnet position sensing array can be used to determine the corresponding angle of the needle guide rail. In particular, based on the position of the wedge 3300 at A as determined by the position sensing array, the distance between points A and B can be determined. This distance can be used in combination with known, fixed dimensions of the needle guide rail and wedge 3300 to determine the angle of needle guide rail 3350 using geometric calculations (e.g. calculations of the angles of a triangle using one or more of the distance between A and B as one side, the length of wedge 3350 as another side, and the length of guide rail 3350 in determining the third side or hypotenuse of the triangle).

FIG. 1l illustrates an exemplary handheld ultrasound unit 1000 according to an embodiment of the invention. The handheld ultrasound unit 1000 (which may also be referred as a probe, ultrasound probe, etc.) comprises data transfer interface 1001, display 1050, user controls 1300, software module 1002, transducer array 1101, and position sensing system 1003. Other components, modules or the like may be included without departing from the scope of the invention.

Data transfer interface 1001 is operable to transmit data for further processing and/or receive input related to remotely processed data. Data transfer interface 1001 may transmit data for remote processing via at least one communication means (e.g. via a dock (or docking station), wired or wireless connection, etc.). Depending on the complexity of the analysis to be performed, scenarios may arise where the data (e.g. ultrasound images and/or user input) are offloaded to a remote processing system which analyzes the data and returns feedback to the handheld ultrasound unit 1000. The data transfer interface 1001 facilitates this data transmission/reception. Data transfer interface 1001 is operable to transmit data for storage at a location remote from the handheld ultrasound unit 1000.

Display 1050 is operable to display information associated with data obtained and/or generated in association with use of the ultrasonic needle guidance system 1500. Display 1050 may display ultrasound images generated by the handheld ultrasound unit 1000. Display may provide longitudinal images and/or transverse images of the underlying anatomy. Display may be configured to switch between displaying a longitudinal image and a transverse image (perpendicular to the longitudinal image). Display may be configured to simultaneously display at least one longitudinal image with at least one transverse image. Display may display a longitudinal image simultaneously with a plurality of transverse images wherein each transverse image is associated with a different imaging plane along the length of the handheld ultrasound unit. Display may be configured to display a longitudinal image while simultaneously displaying and switching between different transverse images. Displaying a plurality of transverse images (either sequentially or simultaneously) provides the benefit of being able to visualize a needle at multiple points along its insertion trajectory allowing for a better understanding of the actual needle path. Display may be configured to provide feedback to a user regarding at least one of positioning of the handheld ultrasound unit, indicating what images are needed for further processing, needle angle (determined from the guide assembly and/or image processing).

User controls 1300 may comprise a user interface for allowing the user to provide input related to control of the system. User controls 1300 may comprise one or more physical controls including, but not limited to, button, knob, toggle, dial, switch, slider, and/or touch sensor. In one aspect, user controls may be embodied in display 1050 (e.g. via touchscreen controls displayed on display 1050). User controls 1300 may serve to provide various functions such as, but not limited to, switching between displayed views (e.g. between longitudinal and transverse), receiving input from a user indicating a target to be reached with a needle, storing/saving images, and the like.

Software module 1002 is operable to control one or more functions related to an ultrasonic needle guidance process. The software module is generally configured to at least one of: track a current needle location and/or trajectory based on input received from the needle guide assembly and/or from image processing, identify a recommended needle angle and/or trajectory, compare the current needle location and/or trajectory with the recommended needle angle/trajectory, and/or notify a user of the current needle angle/trajectory status. The software module may comprise signal processing circuitry for processing signals received from the position sensing system 1003 for determining the location of the handheld ultrasound unit 1000 (e.g. the location relative to a reference location as discussed below). The software module may comprise signal processing circuitry for processing signals received from the transducer array to generate ultrasound images. The software module 1002 may analyze ultrasound images to determine characteristics of the anatomy, needle advancement, and/or handheld ultrasound unit positioning (e.g. location and/or orientation). Software module 1002 may employ needle enhancement techniques to identify and accentuate the current location and/or projected path of the needle. The software module 1002 may process input from a needle guide assembly to determine characteristics of needle advancement. Software module 1002 may receive input from at least one of position sensing system 1003, transducer array 1101 (or from a signal processing module configured to process obtained transducer signals), and/or user controls 1300 and process the input and/or adjust display 1050 accordingly, in real-time.

The software module 1002 may comprise a processor and/or memory for processing received input and generating corresponding output. The software module 1002 may process input to identify an inserted needle and/or projected needle trajectory in a plurality of imaging planes (e.g. longitudinal and transverse) thereby allowing a user to simultaneously view progress of the needle guidance procedure from different perspectives to ensure the needle is approaching the target in a desirable manner. The software module 1002 may generate and provide at least one notification to be displayed to a user (e.g. on display 1050) as a result of the processing performed. For example, software module 1002 may notify a user of a change in expected needle trajectory status, such as a deviation from the recommended trajectory that exceeds a threshold or when an expected needle trajectory indicates the expected path will result in missing a target or indicates the expected path will intersect an anatomical structure to be avoided (e.g. a sensitive anatomical structure that could lead to patient complications if pierced by a needle).

The software module 1002 may perform image processing (locally or may be assisted by a remote processing system) to identify and accentuate needle location. Software module 1002 may generate an image depicting at least one of needle enhancement or projected needle path. Software module 1002 may employ techniques such as shading, highlighting, overlay(s), pixel blending, etc. to generate images emphasizing the needle location, target, projected needle path, and/or anatomical structures.

The software module 1002 is operable to determine appropriate processing to be performed based on the presence or absence of a needle guide assembly. The software module 1002 may determine an operational paradigm to be used based on the presence (or absence) of a needle guide assembly as determined using the position sensing system 1003 such that the software module is operable to track a needle with or without input from a physical needle guide. In one aspect, software module 1002 adjusts the operational paradigm based on user input (e.g. via user controls 1300). When a needle guide assembly is not present (e.g. as indicated by position, software module 1002 is configured to use image processing to determine and/or display needle angle and/or trajectory information. When a needle guide assembly is present, software module 1002 is configured to use input from needle guide (in particular the angle information) to determine and/or display needle angle and/or trajectory information. Note that the presence of a needle guide assembly does not require relying solely on the needle guide assembly, but instead may use both needle guide information and image processing techniques to determine and/or display needle angle and/or trajectory information. The needle guide assembly may be configured to constrain a needle angle to a certain range depending on the procedure and/or transducer being used. For example, for different procedures, depth of a target to be reached by a needle may vary thus affecting the range of angles which can be used to reach the target while maintaining sufficient capabilities to image the needle. As another example, different procedures or different target depths may involve using a different transducer array (e.g. using a modular transducer array) which is configured for a different depth which also influences the range of acceptable angles over which the needle can be viewed. In other words, steeper needle insertion angles result in less sound wave reflection by the needle (as compared to shallower, more perpendicular orientations) thereby making it more difficult to view the needle. Therefore, the needle guide assembly may constrain (e.g. with control assistance from software module 1002) the needle guide assembly to a range of needle angles suitable for imaging by the transducer array.

Transducer array 1101 generally comprises a plurality of ultrasound elements arranged to image two different planes without changing ultrasound probe positioning. The transducer array may comprise a first array for longitudinal imaging and a second array(s) for transverse imaging. The longitudinal array may comprise a linear array. The transverse arrays may comprise phased arrays. The linear array is generally designed for capturing longitudinal images along a longitudinal axis of a target (e.g. a blood vessel) when the handheld ultrasound unit is properly positioned relative to the target. The phased arrays are generally designed for capturing transverse images perpendicular to the image planes scanned by the linear, longitudinal array. The transducer array 1101 is configured to scan orthogonal dimensions simultaneously and without the need to reposition the ultrasound probe thereby allowing for real-time generation of both longitudinal and transverse images for real time anatomy and/or needle tracking The transducer array may be modular such that different arrays having different designs and element arrangements may be used as needed for adapting the ultrasonic needle guidance system for different procedures and/or to account for different characteristics of users undergoing a procedure (e.g. accounting for changes in target or imaging depth which may vary from patient to patient). In this way, modularity of the transducer array allows for the selection of optimal arrays for a given procedure. Various beamsteering or beamforming techniques may be used to enable imaging over the desired field of view. The transducer array 1101 may be configured to perform three dimensional (3D) imaging. The transducer array may be inside or coupled to the ultrasound probe housing. Additional details of an exemplary transducer array 1101 are depicted and described in association with FIG. 1m below.

Position sensing system 1003 is generally operable to determine at least one of the presence of a needle guide assembly and the angle of a corresponding needle guide rail when the needle guide assembly is present (i.e. positioned in close proximity to the handheld ultrasound unit 1000). Position sensing system 1003 may comprise at least one magnet sensor operable to detect the presence of at least one magnet. Position sensing system 1003 may comprise a first magnet sensor for detecting the presence of a first magnet in the needle guide assembly. The first magnet sensor may measure the magnetic field associated with the first magnet. When the magnetic field sensed by the magnet sensor meets certain criteria (e.g. a detected magnetic field strength exceeds a threshold value), the position sensing system 1003 determines that a needle guide assembly is present. Position sensing system 1003 may comprise a second magnet sensor in the form of a magnetic position sensing array for detecting a location of a second magnet in the needle guide assembly. The second magnet sensor may measure the magnetic field generated by the second magnet and use this information to determine where the second magnet is located along the length of the second magnet sensor (e.g. position sensing array). Position sensing system 1003 may determine the position of the handheld ultrasound unit 1000 relative to a reference position (e.g. a starting position or previously stored/recorded reference position). This relative position may be determined from user input and/or from image processing techniques configured to recognize major anatomical landmarks and determine an approximate location based on the location of the anatomical landmarks. The position awareness may employ accelerometers, gyroscopes, other position sensing devices/components and/or other motion detection devices/components to derive the relative positioning of the ultrasound unit.

Figure 1M:
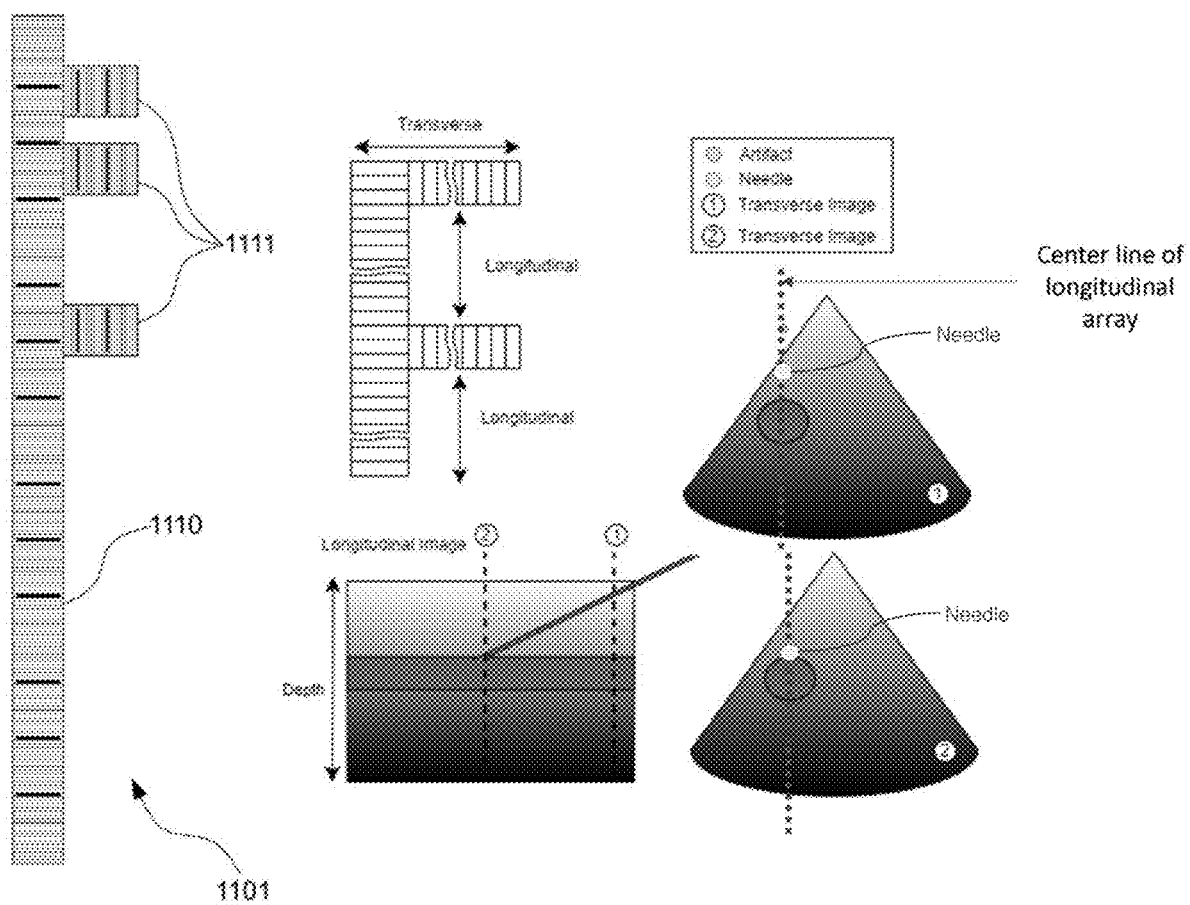
FIG. 1m illustrates an exemplary transducer array according to an embodiment of the invention.

FIG. 1m illustrates an exemplary transducer array and corresponding images according to an embodiment of the invention. The transducer array comprises a linear array 1110 and a plurality of phased arrays 1111. The phased arrays are positioned at different locations along the length of the longitudinal array. The array elements of the phased arrays are aligned perpendicular to the array elements of the longitudinal array. It is noted that while three phased arrays are shown, more or less could be used without departing from the scope of the invention as would be apparent to one of ordinary skill in the art.

Spacing of the phased arrays may be based on a combination of the depth of the target and a range of expected needle angles to be used for reaching the target. Spacing of the phased arrays may be based on a range of needle angles to which the needle should be constrained (e.g. needle angles which allow for ultrasonic detection of the needle). The spacing of the phased arrays may be configured so that one of the plurality of phased arrays can be aligned directly over the needle target such that the resulting image depicts the needle in close proximity to the target after the needle has been advanced towards the target. This configuration of array elements (sometimes referred to herein as an "F" configuration) provides various benefits over other configurations, such as a "T" or "+" based configuration of elements where phased array elements are provided on both sides of a longitudinal array. This F configuration allows for reduced cost, fewer number of transducer elements, and reduced space requirements over other configurations. Furthermore, this configuration reduces and/or eliminates the problem and complexities associated with blending of images when phased arrays are on either side of the longitudinal array. Moreover, the series of transverse image planes (three in this example) provide confidence that the device is aligned with the target and provides multiple checkpoints to confirm needle placement in the transverse plane during insertion. These transverse image planes provide context for structures around the target, adding to the safety provided by the device. For example, in the case of the target being a femoral artery, the transverse image planes may allow for identification and avoidance of nearby anatomical structures such as femoral vein, femoral nerve, lymphatics, etc. To ensure visualization of puncturing of the target with the needle, this configuration allows for adjustment of the needle entry angle based on the target puncture depth such that the puncture depth aligns with one of the transverse image planes.

A challenge with the longitudinal array is imaging the entire width of the needle trajectory while minimizing the total number of elements required. To address this, the transducer elements may be configured with pitch suitable for identifying and/or enhancing needle appearance. For example, a pitch of 1.52 may be used for the longitudinal array as a good trade-off in reducing grating lobe levels and total element count while maintaining suitable imaging at desired depths. For the phased array(s), it is desirable to have a larger aperture, however, grating lobe artifacts must also be considered. For the phased array(s), a pitch of 0.72 may be used as a good compromise between steerability and resolution. These are exemplary pitch values and other pitch values among other transducer configurations may be used without departing from the scope of the invention as would be apparent to one of ordinary skill in the art. The transverse array(s) may be configured to image the transverse cross section of the target (e.g. a femoral artery) as well as the needle tip at a fixed depth thereby enhancing the ability to image and view the needle in close proximity to the target to improve the likelihood that the target is punctured as desired.

It is noted that although depicted in FIG. 1m with generated images having the center line of the linear array offset relative to the center line of the transverse images, the system can be reconfigured or employ signal processing techniques to change the alignment and account for the offset as would be apparent to one of ordinary skill in the art. In addition, a different number of arrays and/or spacing of arrays could be used without departing from the scope of the invention as would be apparent to one of ordinary skill in the art.

Figure 2:
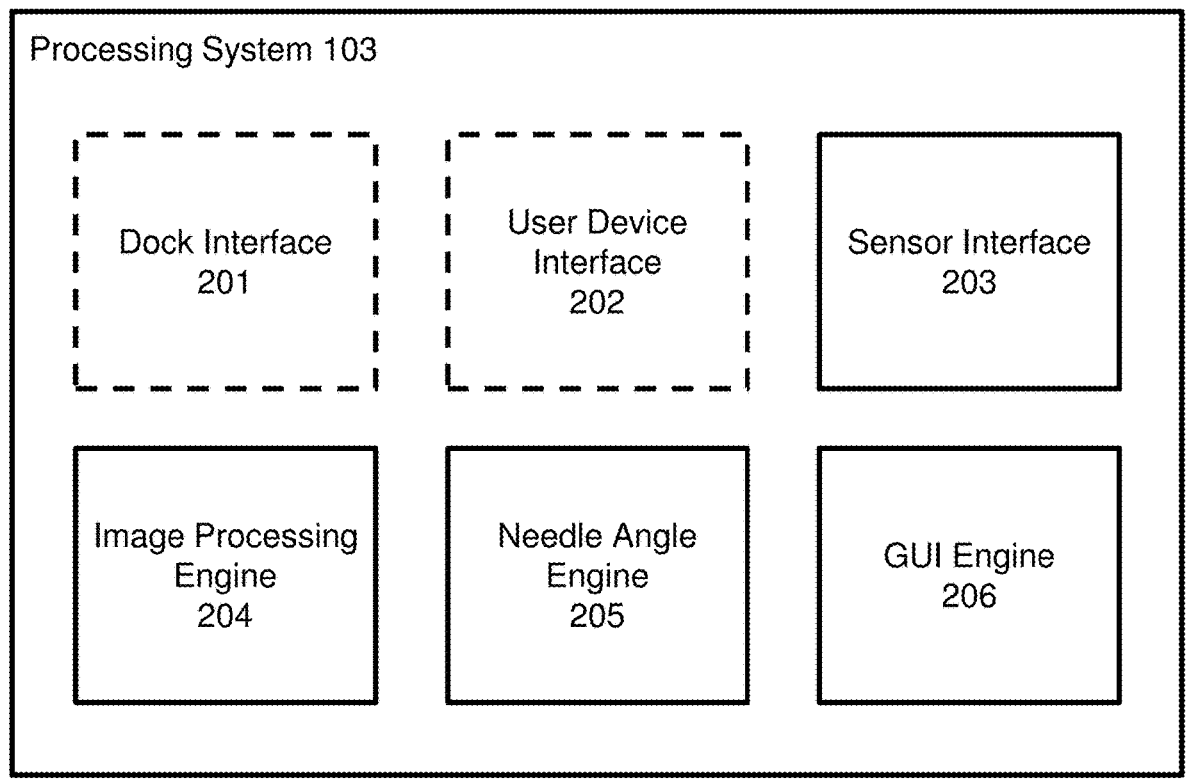
FIG. 2 illustrates an exemplary processing system according to an embodiment of the invention.

FIG. 2 illustrates an exemplary embodiment of the processing system 103. Although depicted here as a separate system, processing system 103 and/or its functionality may be partially or fully incorporated into the handheld ultrasound unit 1000 (e.g. in the software module 1002). Similarly, the software module 1002 and/or its functionality may be partially or fully incorporated into the processing system 103. The processing system 103 includes dock interface 201, user device interface 202, sensor interface 203, image processing engine 204, needle angle engine 205, and graphical user interface (GUI) engine 206. The various components described herein are exemplary and for illustration purposes only and any combination or subcombination of the various components may be used as would be apparent to one of ordinary skill in the art. Other systems, interfaces, modules, engines, databases, and the like, may be used, as would be readily understood by a person of ordinary skill in the art, without departing from the scope of the invention. Any system, interface, module, engine, database, and the like may be divided into a plurality of such elements for achieving the same function without departing from the scope of the invention. Any system, interface, module, engine, database, and the like may be combined or consolidated into fewer of such elements for achieving the same function without departing from the scope of the invention. All functions of the components discussed herein may be initiated manually or may be automatically initiated when the criteria necessary to trigger action have been met.

Dock interface 201 is operable to enable communication between the dock 102 and processing system 103. In one aspect, dock interface 201 is optional (and may not be present) such as when processing system 103 is incorporated into dock 102 or when processing system 103 (or its equivalent operations) are incorporated into handheld ultrasound unit 1000 (e.g. in software module 1002). Dock interface 201 may receive ultrasound images from dock for further processing. Dock interface 201 may provide processing results to dock 102 for relay to ultrasound device 110.

User device interface 202 is operable to enable communication between the dock 102 and processing system 103. In one aspect, user device 110 (e.g. ultrasound device) may communicate directly with processing system 103 or via network 150 to obtain data from user device and provide feedback to user device. User device interface may comprise at least one of a wired interface and a wireless interface for communicating with user device. In one aspect, user device interface may be part of dock 102 such as when processing system 103 is incorporated into dock 102.

Sensor interface 203 is operable to obtain sensor input related to position sensing circuitry (e.g. from position sensing system 1003). Sensor interface 203 may obtain sensor input associated with needle guide angle. Sensor interface 203 may obtain sensor input associated with user device position.

Image processing engine 204 is operable to analyze obtained images to identify at least one of anatomy, target blood vessel puncture sites, and potential needle paths to reach target puncture site. Image processing engine 204 may employ AI/ML algorithms to identify anatomy, puncture sites and/or needle paths. Image processing engine 204 may analyze images obtained in real-time in order to provide feedback regarding the progress of an ongoing needle insertion/removal procedure.

Needle angle engine 205 is operable to process at least one of sensor input and processed images to determine a needle angle. Needle angle engine 205 may determine a recommended needle angle. Needle angle engine 205 may determine a current needle angle. Needle angle engine 205 may generate an alert or notification when a current needle angle does not match a recommended needle angle or is not within a threshold amount of recommended needle angle.

Graphical user interface (GUI) engine 206 is operable to generate display interfaces to be displayed on the ultrasound device. GUI engine may generate processed images with identified anatomy for display. GUI engine may execute pixel blending to render images such that different anatomical structures are displayed in different colors, shading, patterns or combinations thereof. GUI engine may generate at least one of current needle path and projected needle path overlays to be displayed in combination with real-time ultrasound images. GUI engine may generate a display indicating to a user a direction and/or orientation (e.g. rotation) to move the ultrasound device.

Figure 3:
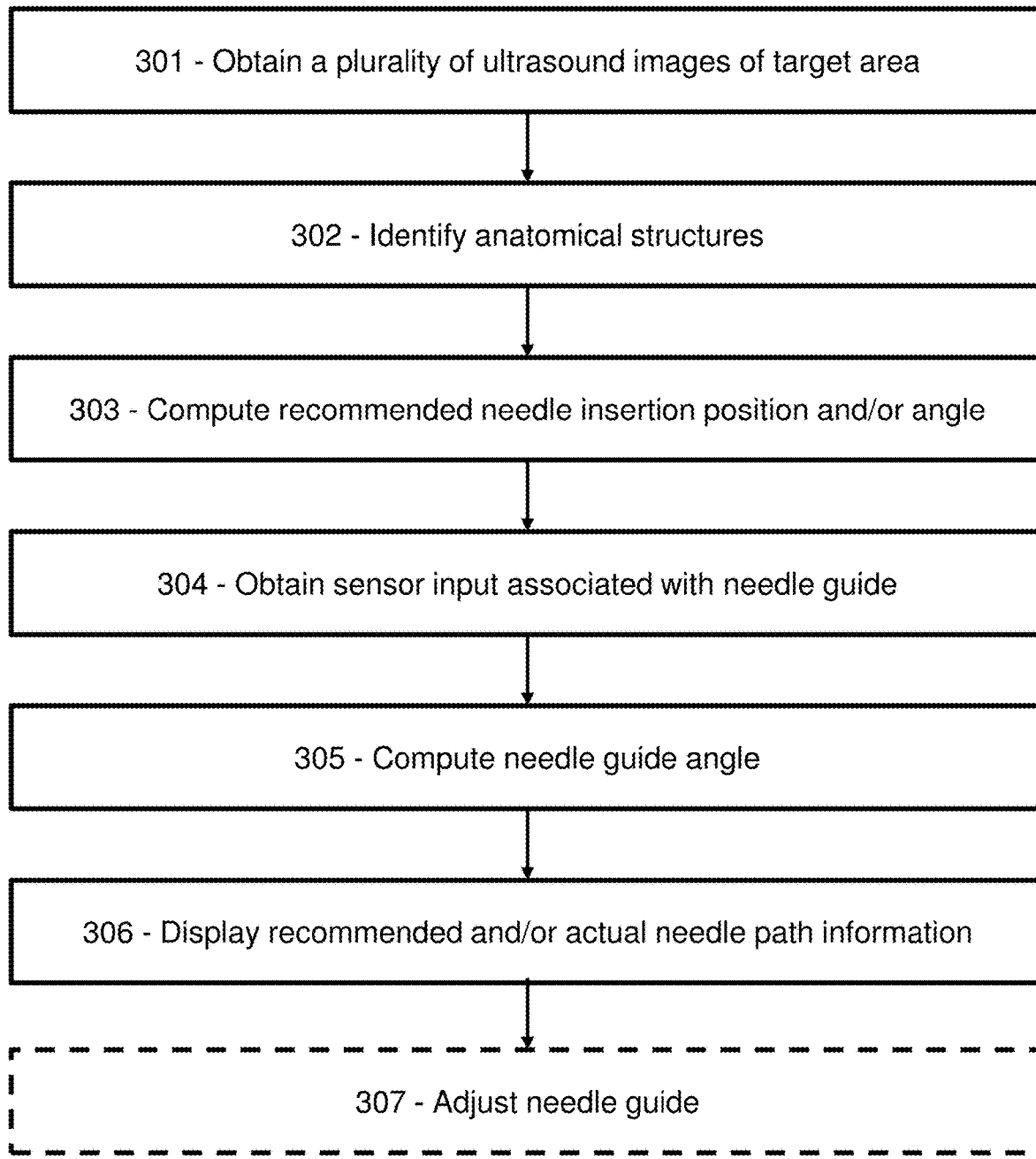
FIG. 3 illustrates an exemplary process for ultrasound needle guidance according to an embodiment of the invention.

FIG. 3 illustrates an exemplary process for ultrasound needle guidance according to one embodiment of the invention. The process comprises obtaining a plurality of ultrasound images of target area 301, identifying anatomical landmarks 302, computing recommended needle insertion position and/or angle 303, obtaining sensor input associated with needle guide 304, computing needle guide angle 305, displaying recommended and/or actual needle path information 306. The process steps described herein may be performed in association with a system such as that described in FIGS. 1 and/or 2 above or in association with a different system. The process may comprise additional steps, fewer steps, and/or a different order of steps without departing from the scope of the invention as would be apparent to one of ordinary skill in the art.

At 301 the process comprises obtaining a plurality of ultrasound images of a target area. Obtaining ultrasound images may comprise obtaining at least one image along a longitudinal axis of a target and at least one image along a direction perpendicular to the longitudinal axis of the target. The target may comprise a blood vessel, such as the femoral artery. The obtained images may comprise images of the target blood vessel and other nearby anatomy such as other blood vessels, bones, nerves, ligaments. In one aspect, the obtained images may comprise images of at least a portion of the femur and/or the pubic bone. In one aspect, obtaining images may comprise displaying feedback to a user indicating a direction to move the user device and/or an orientation (e.g. rotation) of the user device to allow the necessary images to be obtained. In one aspect, obtaining images may comprise obtaining Doppler mode images of blood flow within blood vessels in the area of interest. In one aspect, images may be obtained (with or without GUI guidance/instruction) such that images needed to identify distal structures are obtained, followed by images needed to identify proximal structures, followed by images at the distal position of the femoral head where the device is likely to be held in place and maintained in order to provide real-time feedback through the needle insertion procedure. In one aspect, moving the device distally to femoral head is accomplished under fluoroscopic guidance wherein a radiopaque indicator or marker is attached to or built into the handheld device such that the radiopaque indicator can be aligned perpendicular to the center of the femoral head along the axis of the femur thus providing increased certainty that the handheld unit is in the proper position for the needle insertion procedure. In one aspect, ultrasound images may be continually acquired after the needle has been removed in order to detect post-procedural bleeding.

At 302 the process comprises identifying anatomical structures. Anatomical structures may be identified by analyzing the obtained images using artificial intelligence (AI) or other image processing algorithms to identify key anatomical structures or landmarks for the procedure. The key anatomical structures or landmarks may comprise one or more of the following: common femoral artery, inferior epigastric artery, superficial femoral artery, *profunda* artery, at least one potential puncture site of the femoral artery, bifurcation location of the femoral artery, the femoral head, pubic bone, and other sensitive anatomy to be avoided during insertion of a needle towards the femoral artery puncture site. Identifying the anatomical structures/landmarks may comprise computing the location (e.g. depth) of the structures, dimensions of the structure(s) (e.g. vessel length, width, etc.), and/or distances between various anatomical structures and/or landmarks.

In one aspect, AI processing of images can provide anatomical identification and feedback when a landmark is not easily identifiable by a user or on the ultrasound image. In many procedures, a user relies on a unique landmark (e.g. a bony landmark such as the femoral head) and knowledge of typical anatomy to determine what anatomical structures are present in an image. When a unique landmark is not present a user may be disoriented or uncertain about what structures are being viewed. The use of AI (which can be trained on historical anatomical and/or procedural data/images) can allow for continued identification of anatomical structures even in the absence of a particular landmark in the current image. This enables a user to proceed with confidence and knowledge of the anatomy they are viewing without needing to reposition the ultrasound probe to find certain landmarks.

In one aspect, AI processing of images can provide real time image segmentation of artery, vein and nerve. In one aspect, a pixel border outline of the target vessel can be provided based on the AI processing. The AI processing may rely on an AI model trained on images of vessels (e.g. the femoral artery) and surrounding anatomy (e.g. veins and nerves) in order to allow the AI processing to better distinguish a target blood vessel such as the femoral artery from other nearby anatomy which should be avoided. In one aspect, the AI processing of vessel images may serve to identify a target puncture site based on AI-derived characteristics of the vessel, such as determining a location with minimal calcification (or calcification below a threshold amount) where the amount of calcification can be quantified or estimated based on the echogenic properties of the pixels associated with the vessel (i.e. because dense mineral deposits are more likely to reflect sound waves, they are distinguishable from areas without mineral deposits where the sound waves continue to propagate without as much reflection).

In one aspect, Doppler mode images may be analyzed to determine the direction of blood flow associated with a blood vessel and aid in identifying the blood vessel and distinguishing blood vessels as arteries or veins based on the flow direction. In one aspect, identifying anatomical structures comprises using input from one or more accelerometers in the handheld unit to determine a distance moved by unit which in combination with the images acquired during such movement can be used to determine anatomical measurements such as blood vessel length and/or distance between anatomical structures. In one aspect, AI processing of images with or without Doppler may be used after removal of the needle from the target vessel in order to identify post-procedural bleeding so that such can be addressed in a timely manner.

At 303 the process comprises computing recommended needle insertion angle and/or position (e.g. skin puncture site). The recommended needle insertion angle and/or location may be determined based on at least one of the identified anatomical structures and/or landmarks, the location of anatomical structures and/or landmarks, the distance between anatomical structures and/or landmarks, and knowledge of the location of the handheld ultrasound unit relative to these structures and/or landmarks. The recommended needle insertion angle and/or location may be determined using AI algorithms operable to evaluate a plurality of permutations of potential insertion angles and/or positions and identify those which are expected to lead to a successful insertion of the needle to the target without compromising the nearby anatomy. In one aspect, the AI algorithm may identify a best or optimal insertion angle and/or position by comparing (e.g. ranking) each permutation expected to lead to a successful insertion of the needle to the target without compromising the nearby anatomy. In one aspect, the recommended needle insertion angle and/or position are computed in real-time as the images are acquired.

In one aspect, needle insertion angle is determined based on manual input from a user. For example, in one aspect, the system provides ultrasonic visualization of the target access site by virtue of simultaneous orthogonal planes, one cross-sectional, and the other longitudinal. A cursor may be generated with an origination at the top of each view indicating the initial position of the needle tip before insertion into the patient skin. A user is enabled to move the cursor down to the desired puncture site in the cross-sectional view, and then can move the cursor left or right along the longitudinal view. The cursor position can then be locked via a button push or other input. The pixel coordinates of this cursor define the depth and forward distance from the skin puncture site. The angle is calculated by the device using these coordinates, the speed of sound in soft tissue, and the pixel resolution provided by the ultrasound beamforming operation and its mapping onto the displayed pixel map. The resulting computed angle may be reported to the user via the user interface as the recommended angle to reach the target based on the user selected target input.

At 304 the process comprises obtaining sensor input associated with needle guide. Sensor input may comprise signals from a magnetic sensor located at the base of the handheld unit, in/on the boot or in/on the needle guide assembly (see FIG. 1*k* and corresponding discussion above). The signal from the magnetic sensor may comprise an indication of magnetic field strength which will correlate to the distance between a magnet and the sensor. If the sensor indicates no magnetic field is sensed or the sensed magnetic field is below a threshold, the system may determine that a needle guide is not present and that further processing should employ different approaches to determining needle angle such as image processing techniques to identify the needle and its orientation.

At 305 the process comprises computing needle guide angle and/or projected trajectory. As described above, the sensor may comprise output indicative of the distance between the sensor and a magnet associated with the needle guide. Using known geometry associated with the needle guide, the sensor output (or computed distance) is used to compute the angle of the needle guide which corresponds to the angle at which the needle will puncture the skin surface and the trajectory the needle will take when advance into a patient. See additional discussion on computing needle guide angle as described above in association with FIG. 1*l*.

When a physical needle guide is not present (i.e. the needle guide assembly is not attached or in use), the process may determine needle guide angle and/or trajectory using image processing techniques. Various techniques may be applied to the ultrasound images to identify and/or enhance the needle appearance. Once identified in the images, an additional algorithm may determine the corresponding angle of the needle and/or the projected needle path based on the current location and/or characteristics of the needle.

At 306 the process comprises displaying recommended and/or actual needle path information. Displaying may comprise displaying an indication that the current needle guide angle does not match the recommended angle. Displaying may comprise displaying an overlay of identified anatomy on image, projected needle path, actual needle path, target puncture site and the like. In one aspect, the anatomical overlay is generated by performing pixel modification or blending to distinguish different structures. For example, based on the different anatomical structures identified (e.g. via AI processing of images) different colors may be blended with the ultrasound image pixels such that pixels associated with one anatomical structure appear in one color while pixels of another anatomical structure appear in a different color. In one aspect, pixels associated with the target puncture site of the target blood vessel may be displayed differently than other pixels associated with that blood vessel. Any number of colors may be used to distinguish different structures and/or targets as would be apparent to one of ordinary skill in the art.

At step 307, the process may comprise adjusting a needle guide. The needle guide may be automatically adjusted to align with a recommended needle path/angle determined by the previous steps. The system transmits control signals to a motorized or electromechanical actuator associated with the needle guide, thereby adjusting the angle of the inclined guide to match the computed trajectory. In alternative implementations, the system may prompt the user to manually rotate a knob or confirm adjustment through visual feedback, while still highlighting the recommended trajectory on the display interface.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Any of the above mentioned systems, units, modules, engines, controllers, interfaces, components or the like may be and/or comprise hardware and/or software as described herein. For example, the processing system 103, the network 150, and subcomponents thereof may be and/or comprise computing hardware and/or software as described herein in association with FIGS. 4-7. Furthermore, any of the above mentioned systems, units, modules, engines, controllers, interfaces, components or the like may use and/or comprise an application programming interface (API) for communicating with other systems units, modules, engines, controllers, interfaces, components, or the like for obtaining and/or providing data or information.

Figure 4:
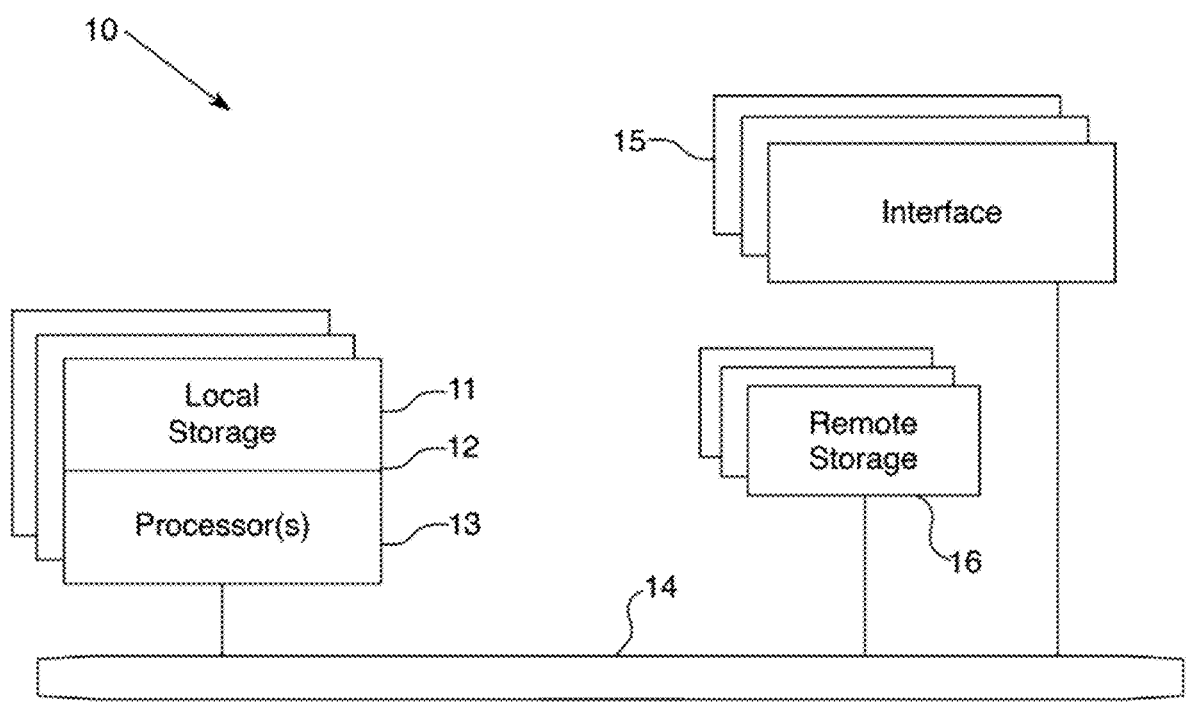
FIG. 4 illustrates one embodiment of the computing architecture that supports an embodiment of the inventive disclosure.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
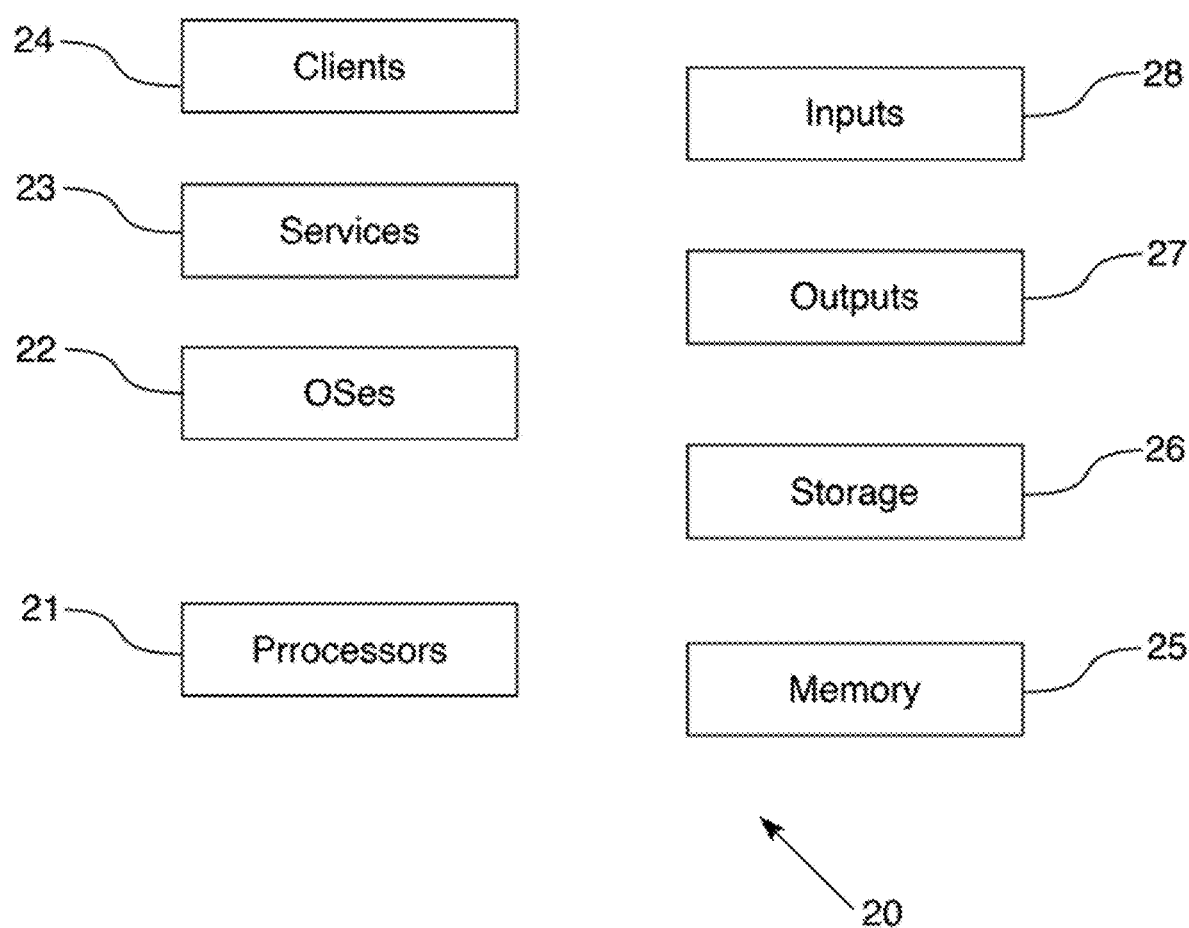
FIG. 5 illustrates components of a system architecture that supports an embodiment of the inventive disclosure.

In some embodiments, systems may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
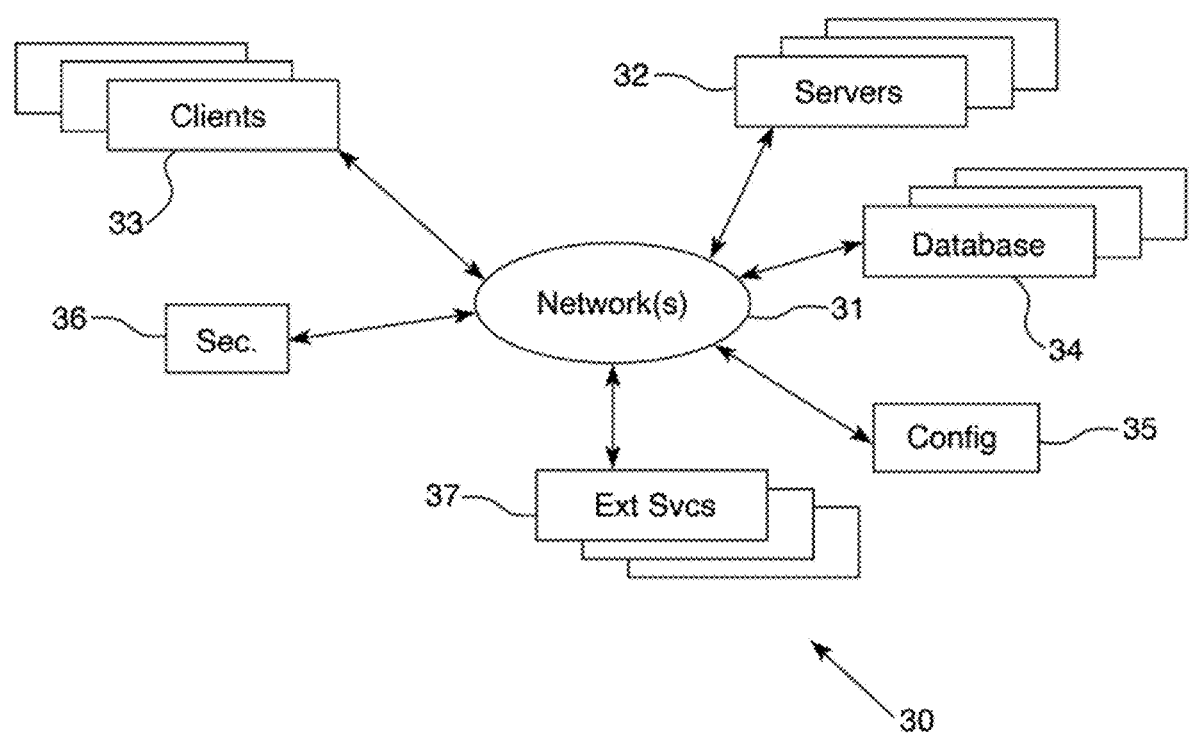
FIG. 6 illustrates components of a computing device that supports an embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 7:
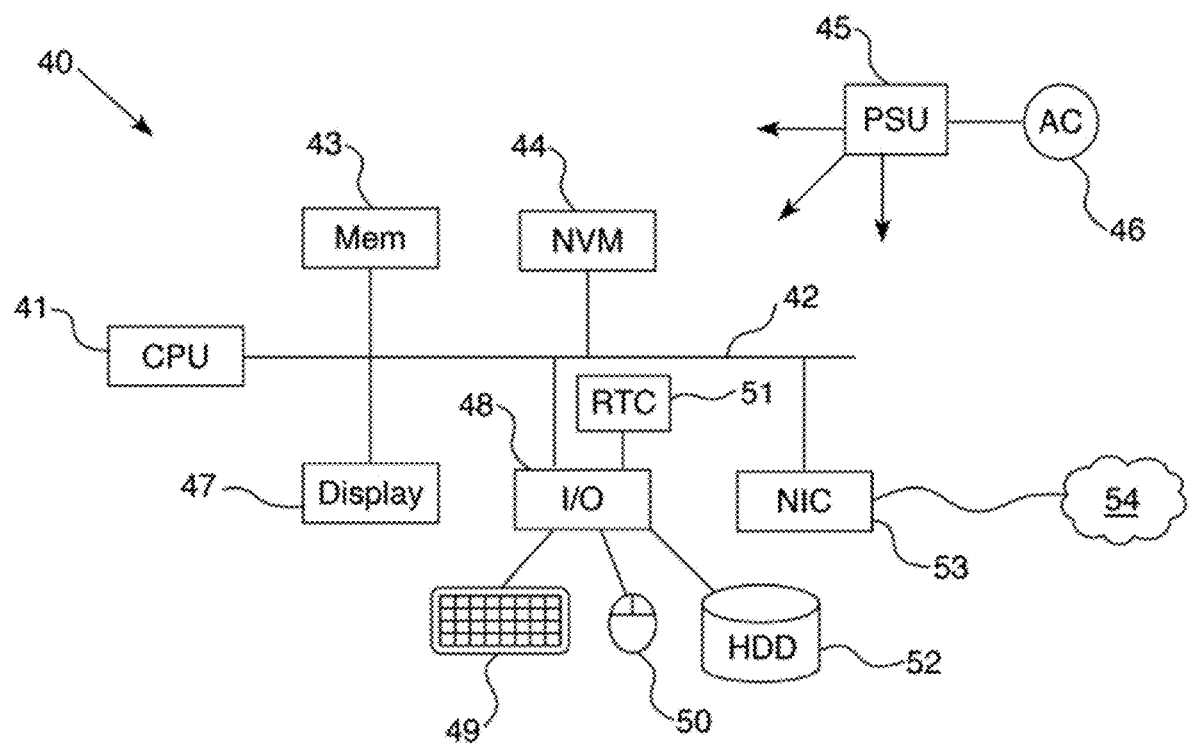
FIG. 7 illustrates components of a computing device that supports an embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for facilitating database queries through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A system for ultrasonic needle guidance, the system comprising:
   a handheld ultrasound probe comprising a probe housing comprising at least a top surface and bottom surface located on opposite sides of the probe housing, the probe housing comprising:
      a transducer array inside or coupled to the probe housing along the bottom surface of the probe housing, the array configured for simultaneously scanning of orthogonal dimensions without repositioning the ultrasound probe allowing for the generation of both longitudinal and transverse images for real time anatomy and/or needle tracking;
   a software module comprising a processor and memory, the software module configured to track a current needle location and/or trajectory based on input received from the needle guide assembly and/or image processing, identify a recommended needle trajectory, compare the current needle location and/or trajectory with the recommended needle trajectory, and/or notify a user of the current needle trajectory status;
   at least one user control operable to control a display to change displayed views, allow the user to provide input indicative of a target to be reached by an inserted needle, and/or save a displayed image;
   the display physically coupled to the probe housing by a rigid or collapsible interface, the display operable to display ultrasound images generated by the probe, the ultrasound images comprising a longitudinal and/or a transverse image, wherein the display is operable, via the rigid or collapsible interface, to be positioned away from the probe housing and wherein a viewable surface of the display is operable to be positioned such that a line drawn through the viewable surface is orthogonal to and passes through both the viewable surface of the display and the top surface of the probe housing, wherein the viewable surface comprises a surface of the display configured to display visual content;
   a boot comprising a boot housing wherein the probe housing interfaces with the boot housing to releasably couple the probe and boot together, the boot comprising:
      an acoustic coupling medium positioned in the base of the boot, wherein the releasable coupling engages the acoustic coupling medium with the ultrasound probe in a manner that securely maintains acoustic coupling between the transducer array and the acoustic coupling medium;
   a sterile sheath configured to fully enclose the probe and the display;
   a needle guide interface for a needle guide assembly, the interface allowing a needle guide to be removably attached, the interface located outside of the sterile sheath; and
   a needle guide assembly, wherein the needle guide assembly comprises a needle guide and a position indicator.

2. The system according to claim 1, wherein the rigid interface comprises a rigid arm for positioning the display at a fixed distance from the probe housing.

3. The system according to claim 1, wherein the display is movably coupled with the probe housing via a display arm for extending the display away from the probe housing, wherein the display arm comprises a hinge and/or telescoping components, the hinge and/or telescoping components configured to allow the display position and/or orientation to be adjusted relative to the probe housing.

4. The system according to claim 3, wherein the sheath is configured to surround the display and display arm when the display is in an extended position.

5. The system according to claim 1, wherein the user control is operable to cause the display to switch between displaying longitudinal and transverse images or to display both longitudinal and transverse images simultaneously.

6. The system according to claim 1, wherein the user control is operable to receive an input to mark a desired puncture site on the displayed image and cause the recommended needle path to be displayed in the longitudinal image and/or in the transverse image.

7. The system according to claim 1, wherein the boot releasably couples to the probe via at least one of a protrusion on the boot which engages with a groove or notch on the probe or a protrusion on the probe which engages with a groove or notch on the boot.

8. The system according to claim 1, wherein the boot comprises a notch providing a rigid surface against which a needle can be advanced into a position viewable by the transducer array.

9. The system according to claim 1, wherein the acoustic coupling medium is configured to provide a fixed standoff between the probe and the skin of an individual when the probe is in use and wherein the transducer array geometry is configured to account for the thickness of the acoustic coupling medium.

10. The system according to claim 1, wherein the acoustic coupling medium comprises a gel pad, or is a unitary piece.

11. The system according to claim 1, wherein the transducer array comprises a linear longitudinal array and a plurality of transverse phased arrays, the phased arrays aligned perpendicular to the longitudinal array, each phased array located at a different position along the longitudinal direction of the longitudinal array, each phased array configured for imaging a different transverse plane along the longitudinal direction of the linear longitudinal array.

12. The system according to claim 11, wherein the software module identifies an inserted needle in at least the longitudinal imaging plane and at least one of the transverse imaging planes.

13. The system according to claim 1, wherein the probe housing further comprises a position sensing array operable to determine a needle guide angle based on the position indicator-located in or on the needle guide assembly.

14. The system according to claim 13, wherein the position sensing array comprises a magnetic field sensing array.

15. The system according to claim 1, wherein the ultrasound probe comprises a needle guide assembly detection sensor configured to determine whether the needle guide assembly is present and positioned in a desired location relative to the probe housing, wherein the software module uses output from the sensor to determine needle tracking techniques to be used, wherein the techniques comprise image processing and/or needle guide geometry characteristics for determining needle trajectory.

16. The system according to claim 15, wherein the needle guide assembly detection sensor comprises a magnetic field sensor.

17. The system according to claim 1, wherein the position indicator comprises a first indicator and a second indicator, wherein the first indicator is configured to move relative to the second indicator as the needle guide angle is adjusted, wherein the software module is operable to use the sensed location of the first indicator to determine the needle guide angle.

18. The system according to claim 17, wherein the first and second indicators comprise first and second magnets, respectively.

19. The system according to claim 1, wherein the needle guide assembly comprises a turn screw that adjusts the angle of the needle guide by raising or lowering a wedge piece which slides within a channel in a needle guide rail.

20. The system according to claim 19, wherein the needle guide assembly is motorized to automatically adjust to a desired angle.

* * * * *